(12) United States Patent
Nakamura

(10) Patent No.: US 8,928,991 B2
(45) Date of Patent: Jan. 6, 2015

(54) ZOOM LENS AND IMAGE PICKUP APPARATUS INCLUDING THE SAME

(71) Applicant: Canon Kabushiki Kaisha, Tokyo (JP)

(72) Inventor: Tomoyuki Nakamura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 56 days.

(21) Appl. No.: 13/861,515

(22) Filed: Apr. 12, 2013

(65) Prior Publication Data

US 2013/0271630 A1   Oct. 17, 2013

(30) Foreign Application Priority Data

Apr. 13, 2012   (JP) .................................. 2012-091815

(51) Int. Cl.
   *G02B 15/14*   (2006.01)

(52) U.S. Cl.
   USPC ........... 359/686; 359/683; 359/684; 359/685; 359/687; 359/715; 359/740; 359/774

(58) Field of Classification Search
   USPC .......................... 359/683–687, 715, 740, 774
   See application file for complete search history.

(56) References Cited

U.S. PATENT DOCUMENTS

| | | | | |
|---|---|---|---|---|
| 6,028,715 | A * | 2/2000 | Takamoto et al. | 359/688 |
| 6,342,974 | B1 * | 1/2002 | Usui | 359/687 |
| 7,903,345 | B2 * | 3/2011 | Nurishi | 359/687 |
| 8,570,662 | B2 * | 10/2013 | Eguchi et al. | 359/684 |
| 8,659,832 | B2 * | 2/2014 | Takemoto et al. | 359/687 |
| 2011/0080647 | A1 * | 4/2011 | Sugita et al. | 359/675 |
| 2011/0279898 | A1 * | 11/2011 | Takemoto et al. | 359/557 |

FOREIGN PATENT DOCUMENTS

| | | |
|---|---|---|
| JP | 2001356381 A | 12/2001 |
| JP | 2009156893 A | 7/2009 |

* cited by examiner

*Primary Examiner* — Evelyn A. Lester
(74) *Attorney, Agent, or Firm* — Rossi, Kimms & McDowell LLP

(57) ABSTRACT

In a zoom lens including a positive first lens unit, negative second lens unit, positive third lens unit, and positive fourth lens unit, the fourth lens unit includes a 41 lens group, a 42 lens group, and a 43 lens group. the lateral magnification of the third lens unit at a wide-angle end when an infinite object is focused, the focal length of the fourth lens unit, the lens configuration length of the fourth lens unit, the air interval between the 41 and 42 lens groups, the air interval between the 42 and 43 lens groups, the focal length of the 42 lens group, the average values of the Abbe constants and partial dispersion ratios of positive lens of the 42 lens group, the average values of the Abbe constants and partial dispersion ratios of negative lenses of the 42 lens group, and the like are appropriately set.

10 Claims, 14 Drawing Sheets

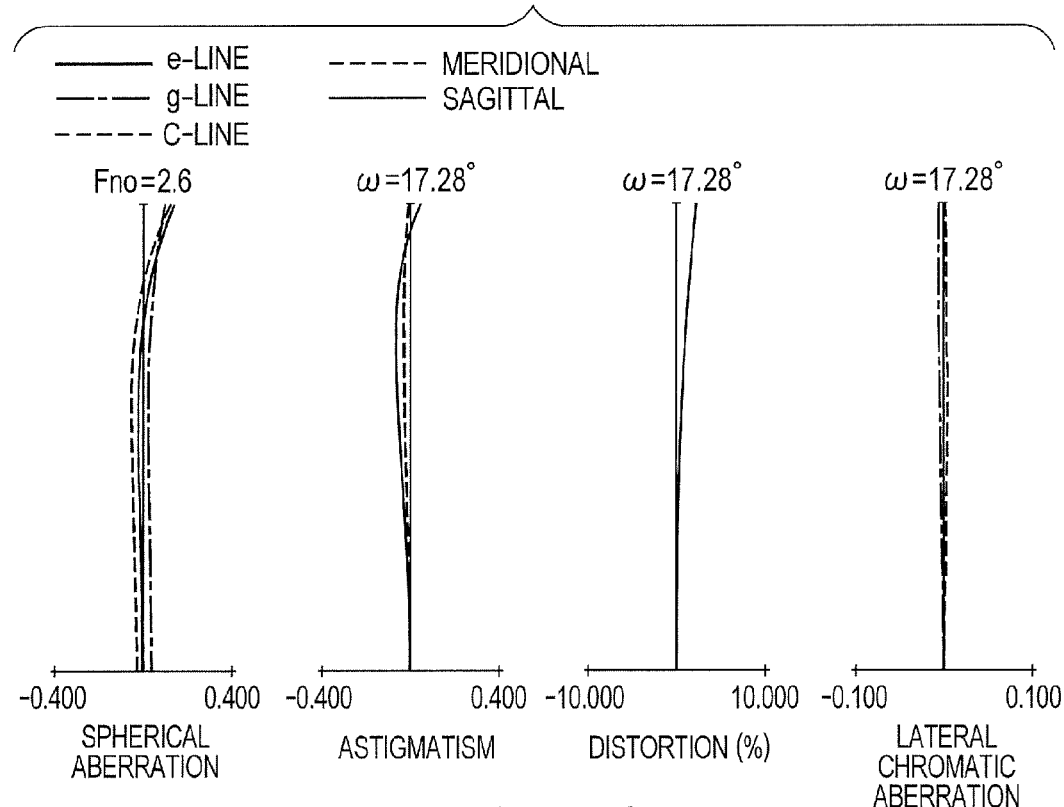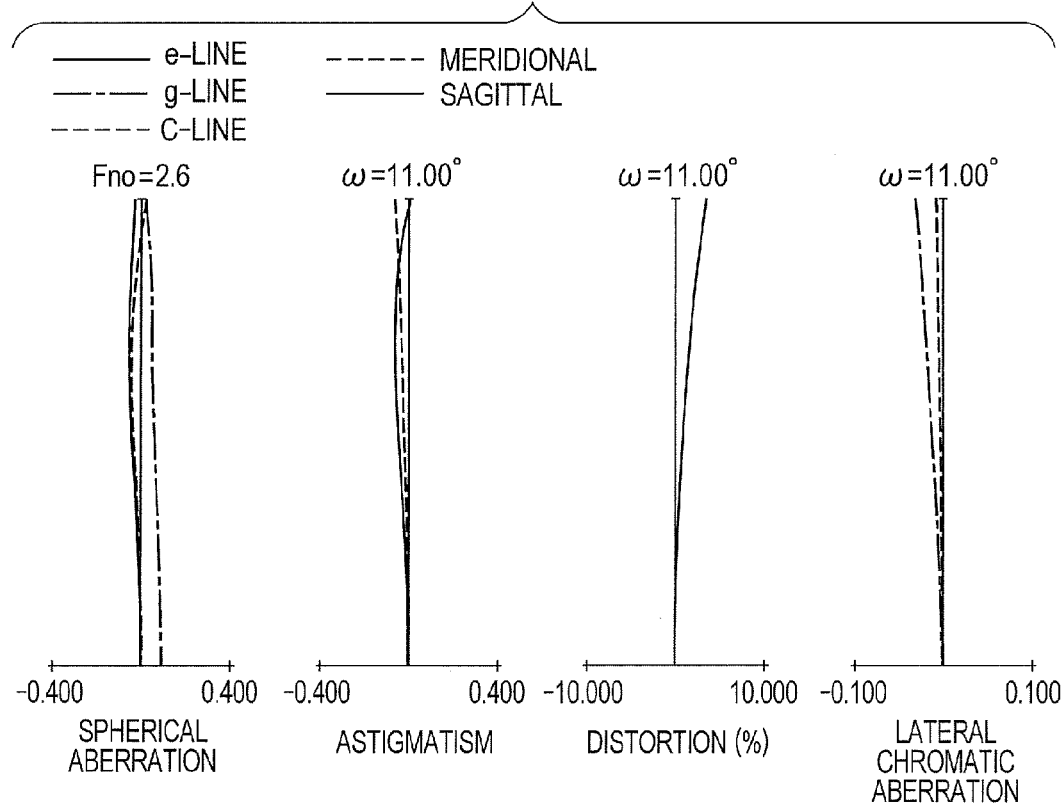

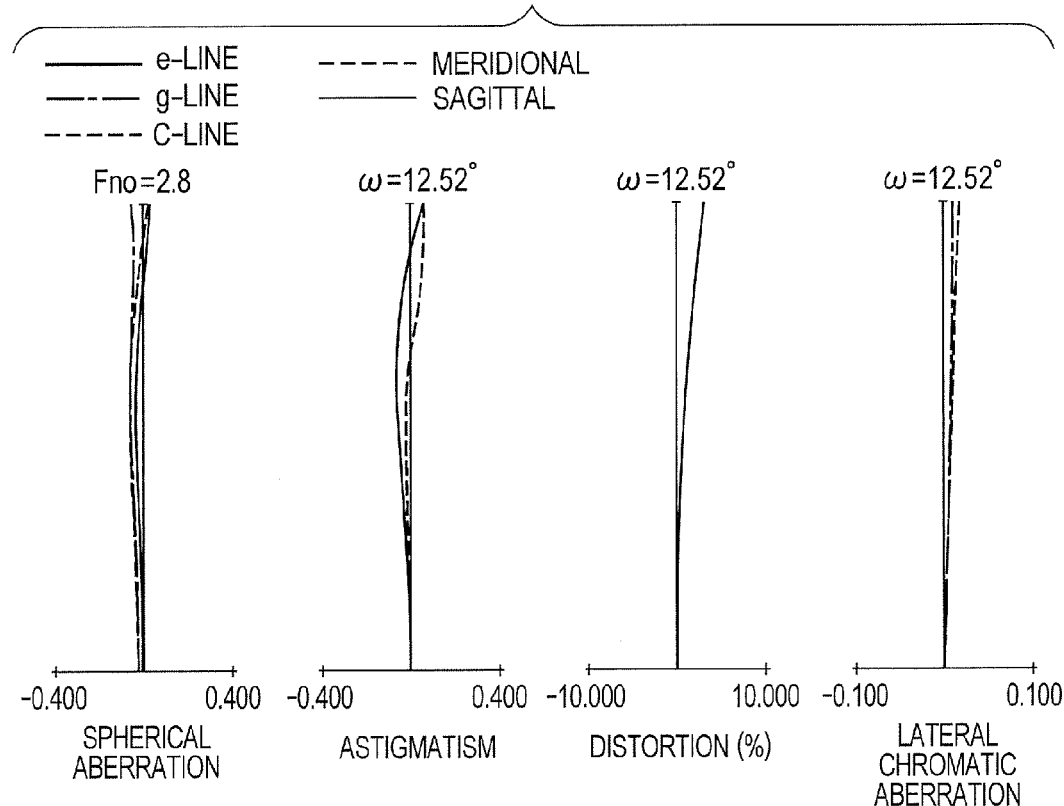
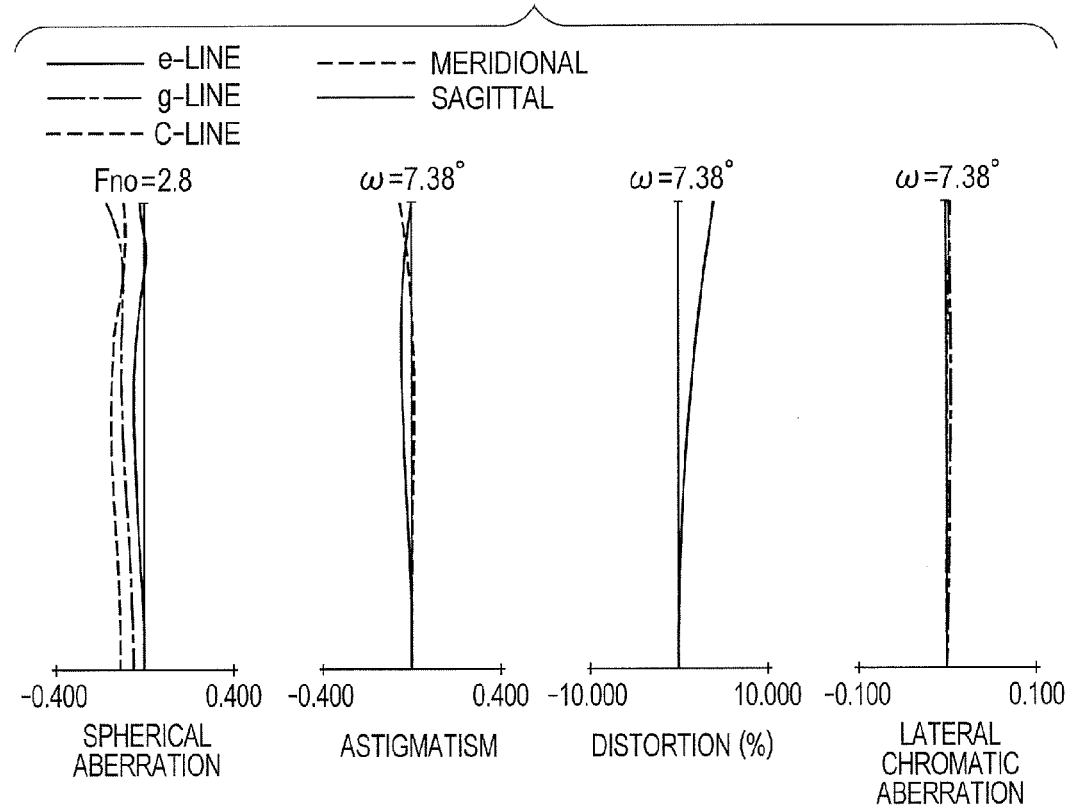

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, and is suitable for, e.g., a broadcasting television camera, movie camera, video camera, digital still camera, surveillance camera, or silver-halide photographic camera.

2. Description of the Related Art

Recently, image pickup apparatuses such as a television camera, movie camera, silver-halide film camera, digital camera, and video camera require a zoom lens having a wide angle of field, a high zoom ratio, and a high optical performance over an entire zoom range. Various zoom lenses having wider angles of field and higher zoom ratios than those of the conventional lenses are known. For example, so-called four-unit zoom lenses are known (Japanese Patent Application Laid-Open Nos. 2001-356381 and 2009-156893). These zoom lenses each include, in order from an object side to an image side, a first lens unit having a positive refractive power, a second lens unit for zooming having a negative refractive power, a third lens unit that corrects an image plane variation caused by magnification-varying and has a positive refractive power, and a fourth lens unit for imaging having a positive refractive power.

Japanese Patent Application Laid-Open No. 2001-356381 has disclosed a four-unit zoom lens having a zoom ratio of about 2.5 and an angle of shooting field at a wide-angle end of about 30°. Japanese Patent Application Laid-Open No. 2009-156893 has disclosed a four-unit zoom lens having a zoom ratio of about 2.7 and an angle of shooting field at a wide-angle end of about 34°.

It is relatively easy to increase the angles of field and zoom ratios of the four-unit zoom lenses having the above-described lens configurations. However, in order to obtain a high optical performance over an entire zoom range by using the four-unit zoom lenses having the above configurations, it is important to well correct, e.g., a lateral chromatic aberration and various off-axis aberrations at the wide-angle end. The lateral chromatic aberration is easily well corrected by using an optical material having anomalous dispersion.

It is, however, difficult to well correct a chromatic aberration even by simply using a lens made of an optical material having anomalous dispersion. On the other hand, it is possible to relatively easily correct the various off-axis aberrations by increasing the number of lenses of each lens unit. However, if the number of lenses is increased, the whole system increases in size and becomes difficult to manufacture.

In order to obtain a high optical performance over the entire zoom range of the above-described, four-unit zoom lens, it is important to appropriately set the lens configuration of the fourth lens unit that is not moved for zooming, and appropriately set the material of each lens included in the fourth lens unit. If these settings are inappropriate, it becomes difficult to correct the lateral chromatic aberration at the wide-angle end, and obtain a high optical performance over the entire zoom range.

SUMMARY OF THE INVENTION

The present invention provides a zoom lens having a wide angle of field and high zoom ratio and capable of readily achieving a high optical performance over the entire zoom range, and an image pickup apparatus including the same.

According to one aspect of the present invention, there is provided a zoom lens including, in order from an object side to an image side, a first lens unit which does not move for zooming and has a positive refractive power, a second lens unit which moves during zooming and has a negative refractive power, a third lens unit which moves during zooming and has a positive refractive power, and a fourth lens unit which does not move for zooming and has a positive refractive power, in which when lenses forming the fourth lens unit are divided from a longest air interval and a second longest air interval in the fourth lens unit, the fourth lens unit includes, in order from the object side to the image side, a 41 lens group having a positive refractive power, a 42 lens group having a negative refractive power, and a 43 lens group having a positive refractive power, the 42 lens group includes one or more positive lenses and one or more negative lenses, and the following conditions are satisfied:

$-0.50 < 1/\beta 3w < 0.50;$ $0.20 < |f42/f4| < 0.90;$ $0.10 < Ld41/Ld4 < 0.40;$ $0.10 < Ld42/Ld4 < 0.40;$ and $-6.00 \times 10^{-3} < (\theta 42p - \theta 42n)/(\nu 42p - \nu 42n) < -2.50 \times 10^{-3},$ where $\beta 3w$ corresponds to a lateral magnification of the third lens unit at a wide-angle end when an infinite object is focused, f4 corresponds to a focal length of the fourth lens unit, Ld4 corresponds to a length on an optical axis from a most object side lens surface to a most image side lens surface of the fourth lens unit, Ld41 corresponds to an air interval between the 41 lens group and the 42 lens group, Ld42 be an air interval between the 42 lens group and the 43 lens group, f42 corresponds to a focal length of the 42 lens group, $\nu 42p$ corresponds to an average value of Abbe constants of materials of the positive lenses included in the 42 lens group, $\theta 42p$ corresponds to an average value of partial dispersion ratios of the materials of the positive lenses included in the 42 lens group, $\nu 42n$ corresponds to an average value of Abbe constants of materials of the negative lenses included in the 42 lens group, and $\theta 42n$ corresponds to an average value of partial dispersion ratios of the materials of the negative lenses included in the 42 lens group.

According to the present invention, it is possible to obtain a zoom lens having a wide angle of field and high zoom ratio and capable of readily achieving a high optical performance over the entire zoom range, and an image pickup apparatus including the same.

Further features of the present invention will become apparent from the following description of exemplary embodiments with reference to the attached drawings.

BRIEF DESCRIPTION OF THE DRAWINGS

FIG. 4B is an aberration diagram when the infinite object is focused at an intermediate zoom position of Numerical Embodiment 2.

FIG. 4C is an aberration diagram when the infinite object is focused at a telephoto end of Numerical Embodiment 2.

FIG. 6B is an aberration diagram when the infinite object is focused at an intermediate zoom position of Numerical Embodiment 3.

FIG. 6C is an aberration diagram when the infinite object is focused at a telephoto end of Numerical Embodiment 3.

DESCRIPTION OF THE EMBODIMENTS

Preferred embodiments of the present invention will now be described in detail in accordance with the accompanying drawings. A zoom lens of the present invention includes, in order from an object side to an image side, a first lens unit that does not move for zooming (magnification-varying) and has a positive refractive power, a second lens unit that moves during zooming and has a negative refractive power, a third lens unit that moves to correct an image plane variation caused by zooming and has a positive refractive power, and a fourth lens unit that does not move for zooming and has a positive refractive power.

"A lens unit does not move for zooming" herein mentioned means that the lens unit is not driven for the purpose of zooming but may be moved for focusing if zooming and focusing are performed at the same time. Lenses forming the fourth lens unit are divided into three lens units from the longest air interval and second longest air interval in the fourth lens unit. In this arrangement, the fourth lens unit includes a 41 lens group having a positive refractive power, a 42 lens group having a negative refractive power, and a 43 lens group having a positive refractive power, in order from the object side to the image side.

Figure 1:
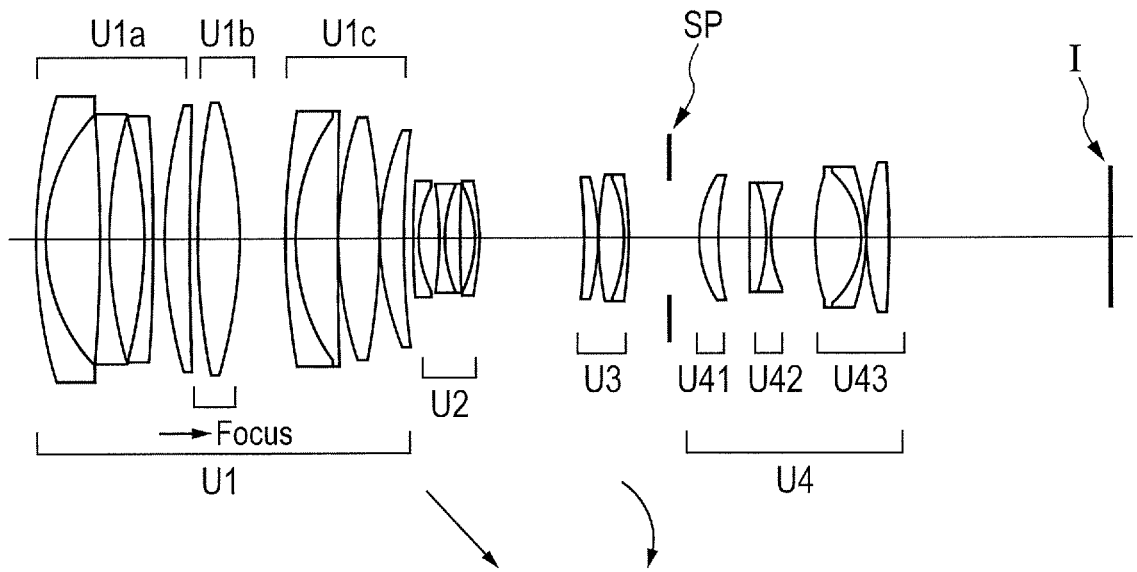
FIG. 1 is a lens sectional view when an infinite object is focused at a wide-angle end of Numerical Embodiment 1.
Figure 2A:
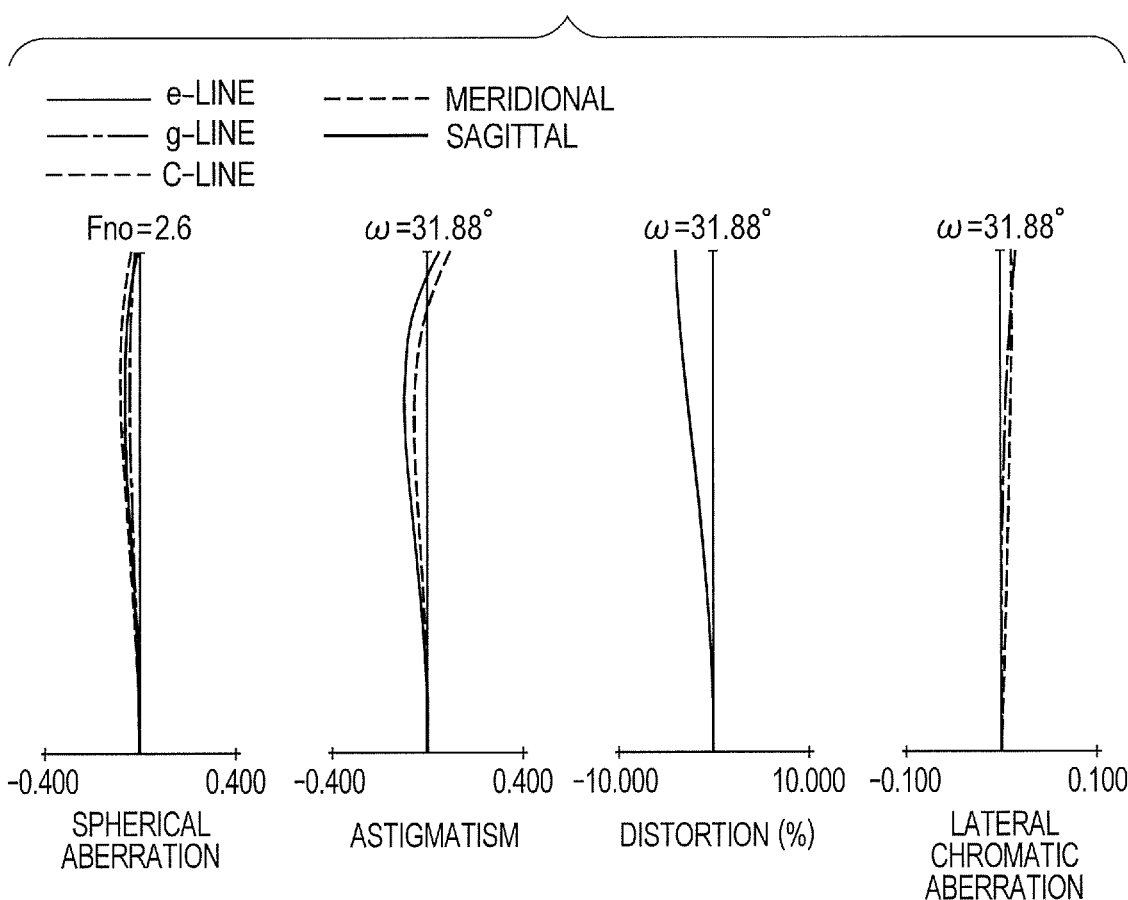
FIG. 2A is an aberration diagram when the infinite object is focused at the wide-angle end of Numerical Embodiment 1.
Figure 2B:
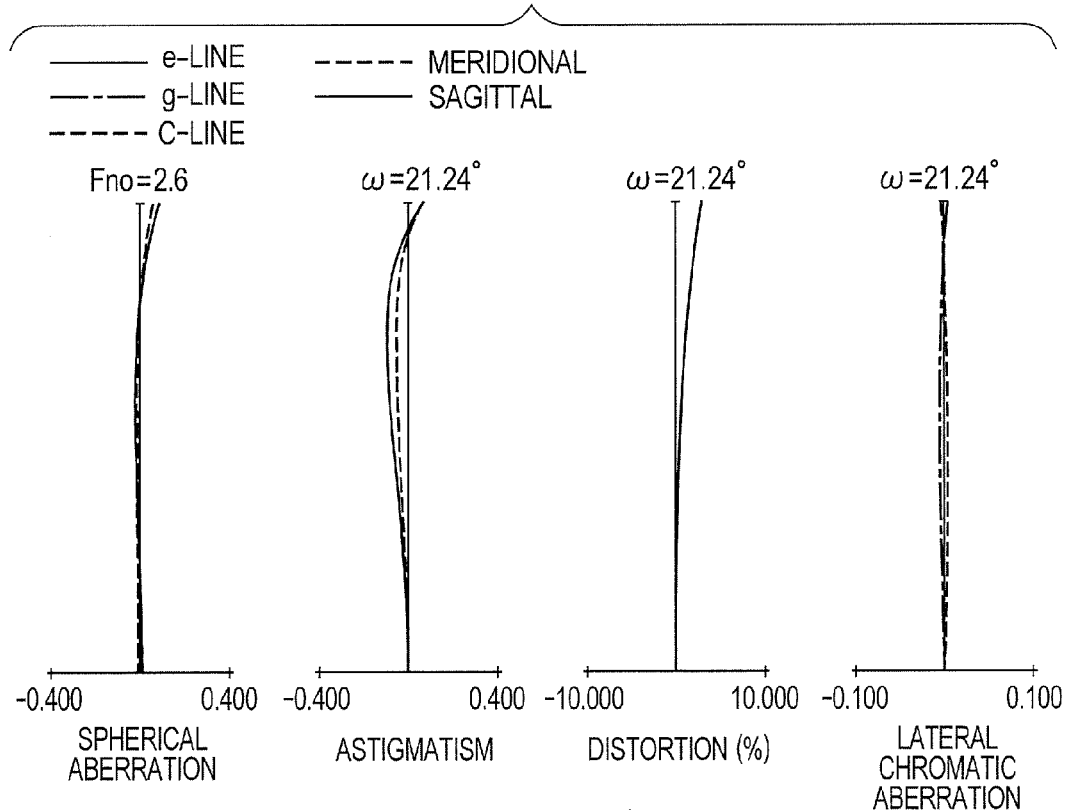
FIG. 2B is an aberration diagram when the infinite object is focused at an intermediate zoom position of Numerical Embodiment 1.
Figure 2C:
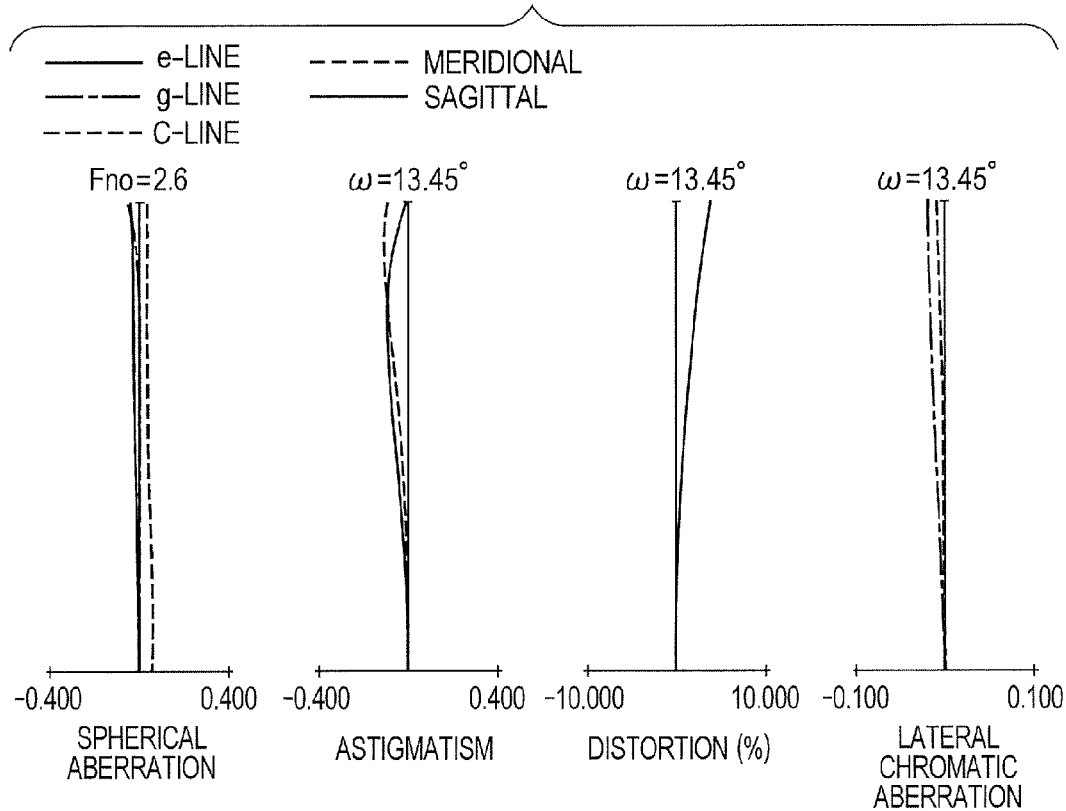
FIG. 2C is an aberration diagram when the infinite object is focused at a telephoto end of Numerical Embodiment 1.

FIG. 1 is a lens sectional view when an infinite object is focused at a wide-angle end (short focal length end) (focal length f=25.00 mm) of a zoom lens of Embodiment 1 (Numerical Embodiment 1) of the present invention. FIGS. 2A, 2B, and 2C are aberration diagrams when the infinite object is focused at the wide-angle end, an intermediate zoom position (focal length f=40.00 mm), and a telephoto end (long focal length end) (focal length f=65.00 mm), respectively, of Numerical Embodiment 1. Note that the focal length is a value when the value of a numerical embodiment is presented in units of mm. This applies to all of the following embodiments.

Figure 3:
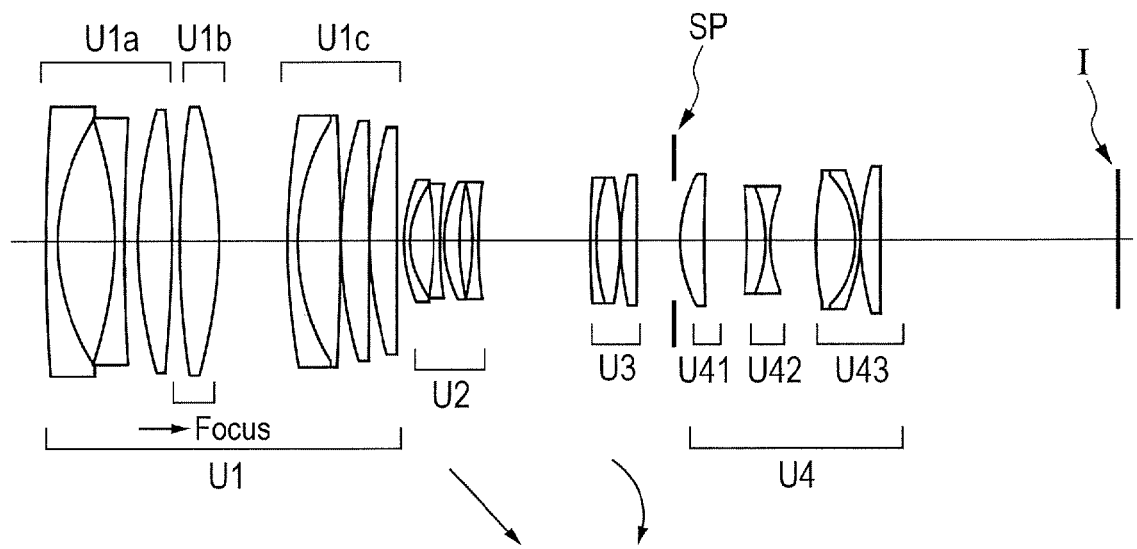
FIG. 3 is a lens sectional view when an infinite object is focused at a wide-angle end of Numerical Embodiment 2.
Figure 4A:
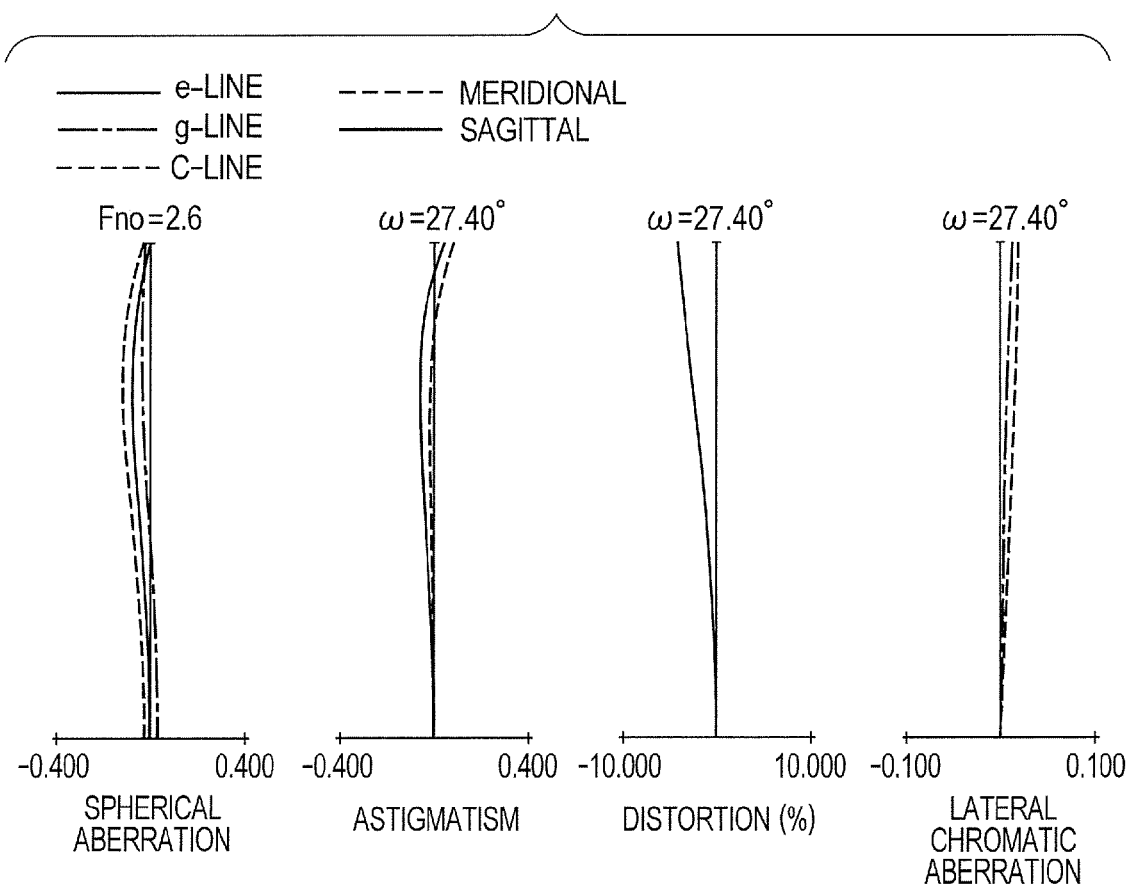
FIG. 4A is an aberration diagram when the infinite object is focused at the wide-angle end of Numerical Embodiment 2.

FIG. 3 is a lens sectional view when an infinite object is focused at a wide-angle end (focal length f=30.00 mm) of a zoom lens of Embodiment 2 (Numerical Embodiment 2) of the present invention. FIGS. 4A, 4B, and 4C are aberration diagrams when the infinite object is focused at the wide-angle end, an intermediate zoom position (focal length f=50.00 mm), and a telephoto end (focal length f=80.00 mm), respectively, of Numerical Embodiment 2.

Figure 5:
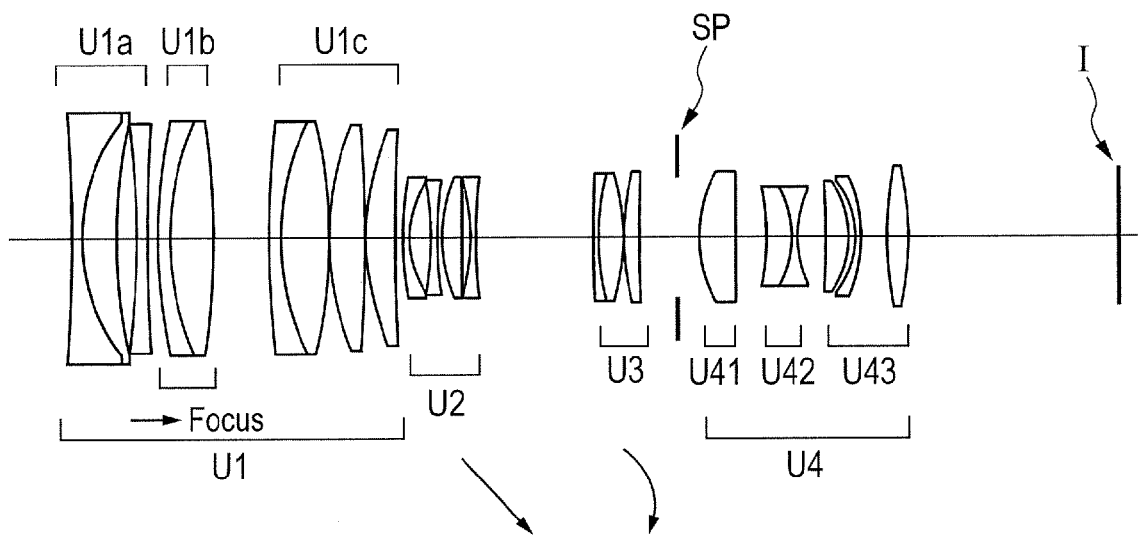
FIG. 5 is a lens sectional view when an infinite object is focused at a wide-angle end of Numerical Embodiment 3.
Figure 6A:
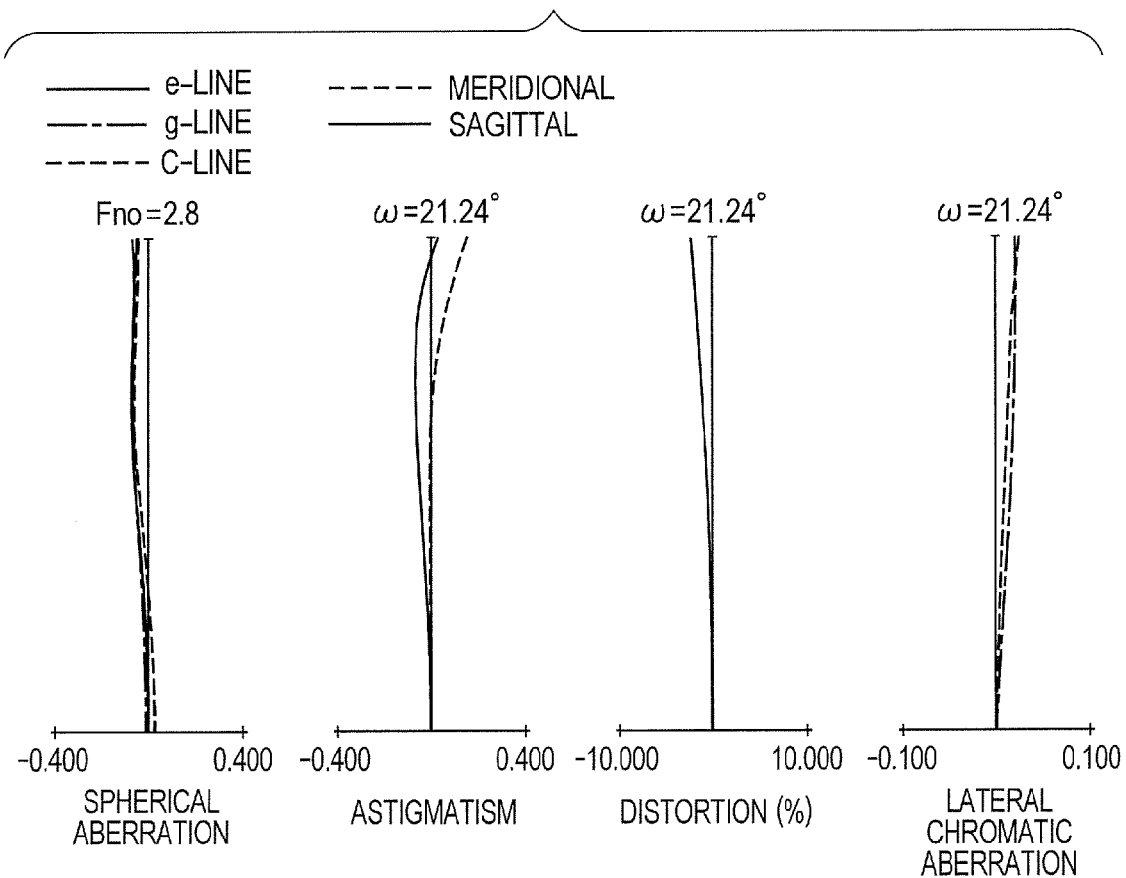
FIG. 6A is an aberration diagram when the infinite object is focused at the wide-angle end of Numerical Embodiment 3.

FIG. 5 is a lens sectional view when an infinite object is focused at a wide-angle end (focal length f=40.00 mm) of a zoom lens of Embodiment 3 (Numerical Embodiment 3) of the present invention. FIGS. 6A, 6B, and 6C are aberration diagrams when the infinite object is focused at the wide-angle end, an intermediate zoom position (focal length f=70.00 mm), and a telephoto end (focal length f=120.00 mm), respectively, of Numerical Embodiment 3.

Figure 7:
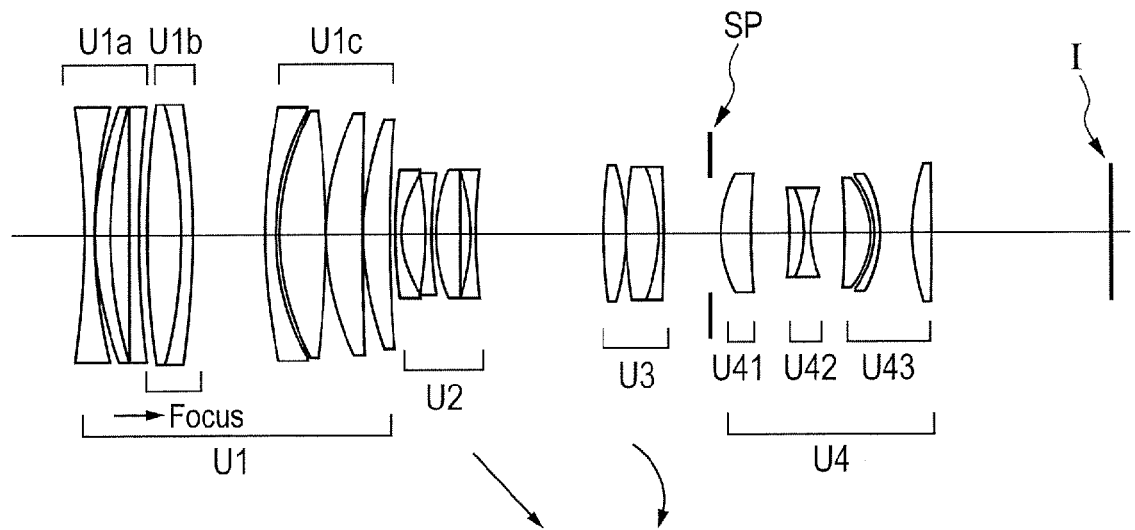
FIG. 7 is a lens sectional view when an infinite object is focused at a wide-angle end of Numerical Embodiment 4.
Figure 8A:
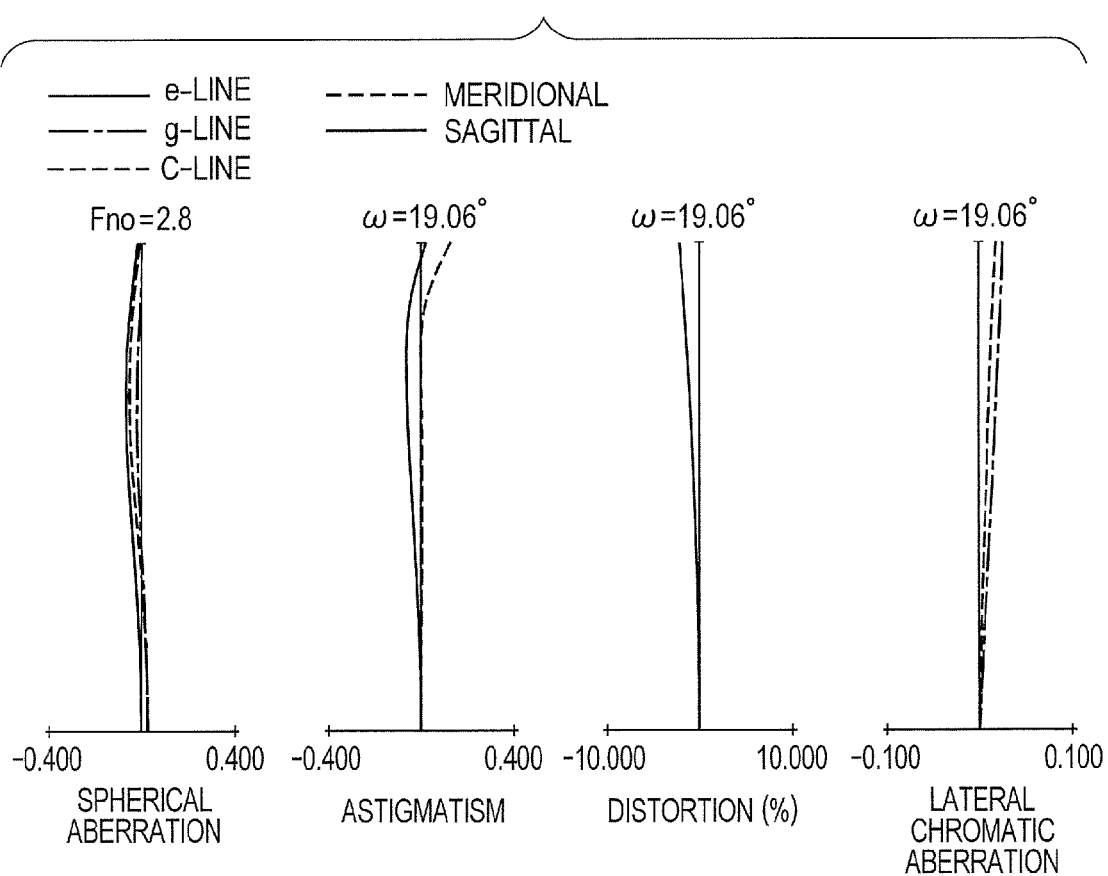
FIG. 8A is an aberration diagram when the infinite object is focused at the wide-angle end of Numerical Embodiment 4.
Figure 8B:
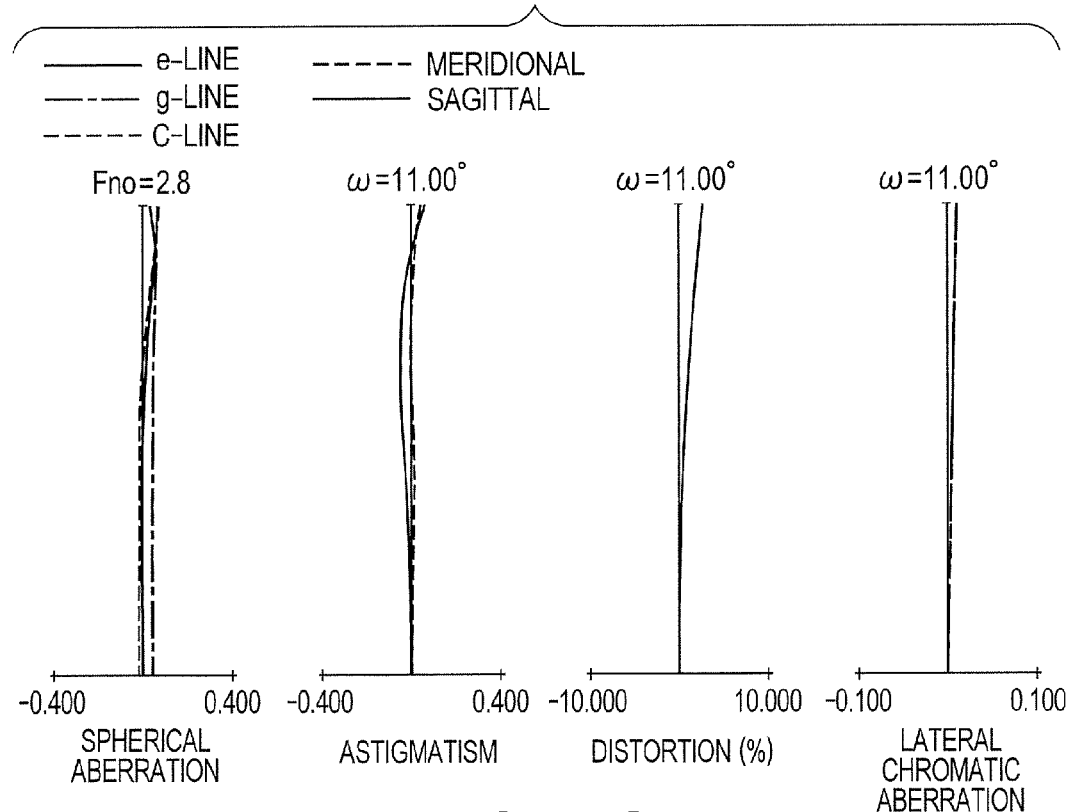
FIG. 8B is an aberration diagram when the infinite object is focused at an intermediate zoom position of Numerical Embodiment 4.
Figure 8C:
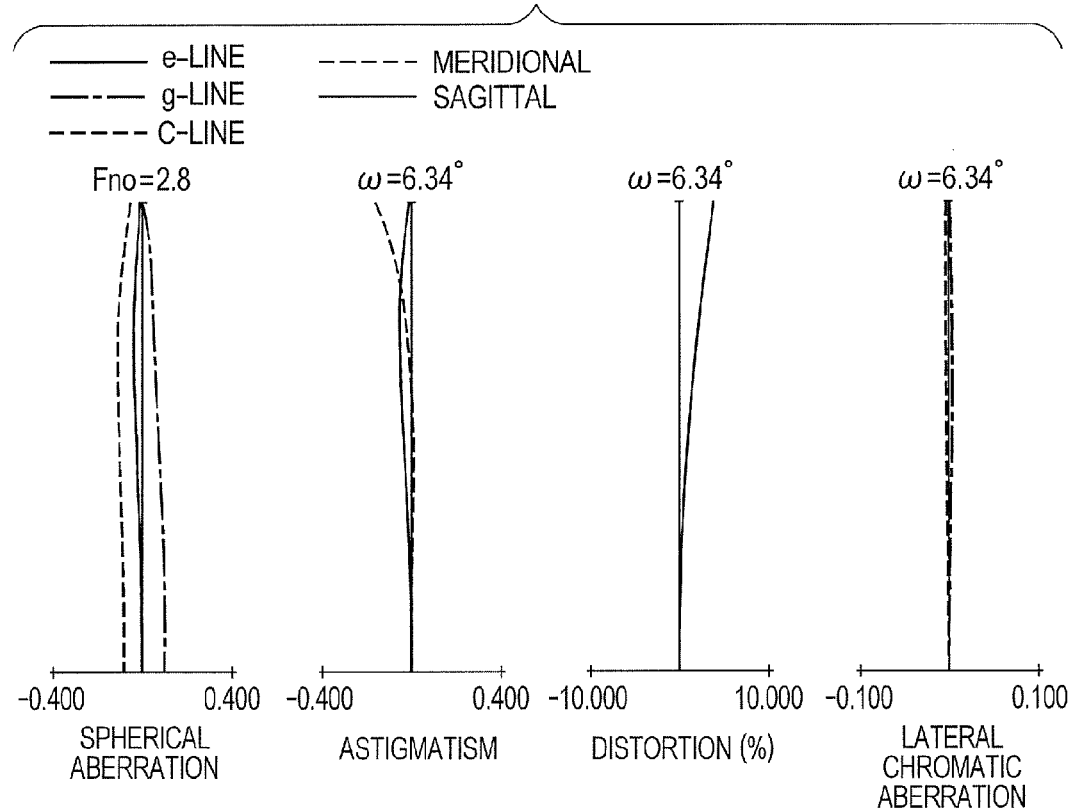
FIG. 8C is an aberration diagram when the infinite object is focused at a telephoto end of Numerical Embodiment 4.

FIG. 7 is a lens sectional view when an infinite object is focused at a wide-angle end (focal length f=45.00 mm) of a zoom lens of Embodiment 4 (Numerical Embodiment 4) of the present invention. FIGS. 8A, 8B, and 8C are aberration diagrams when the infinite object is focused at the wide-angle end, an intermediate zoom position (focal length f=80.00 mm), and a telephoto end (focal length f=140.00 mm), respectively, of Numerical Embodiment 4.

Figure 9:
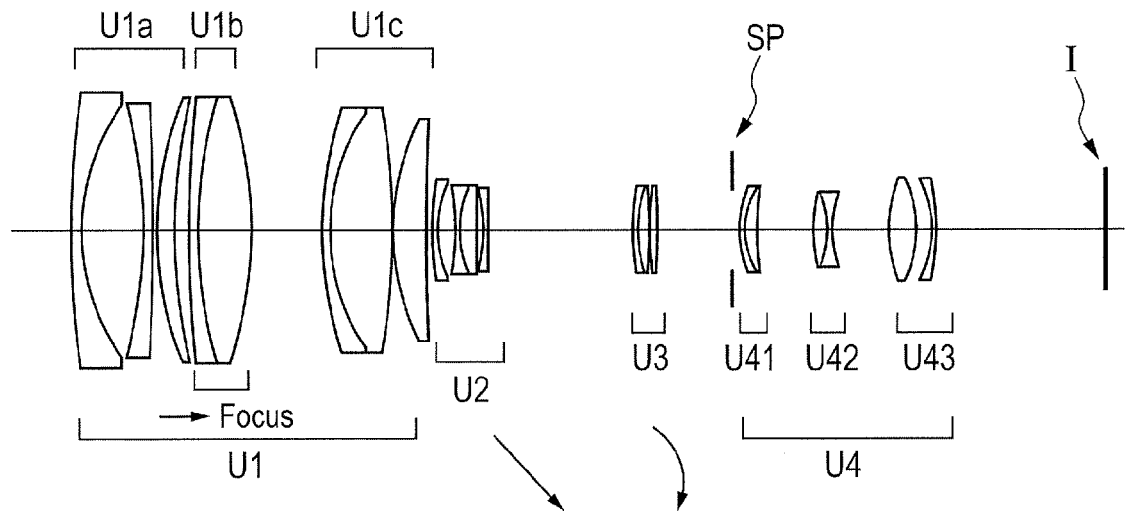
FIG. 9 is a lens sectional view when an infinite object is focused at a wide-angle end of Numerical Embodiment 5.
Figure 10A:
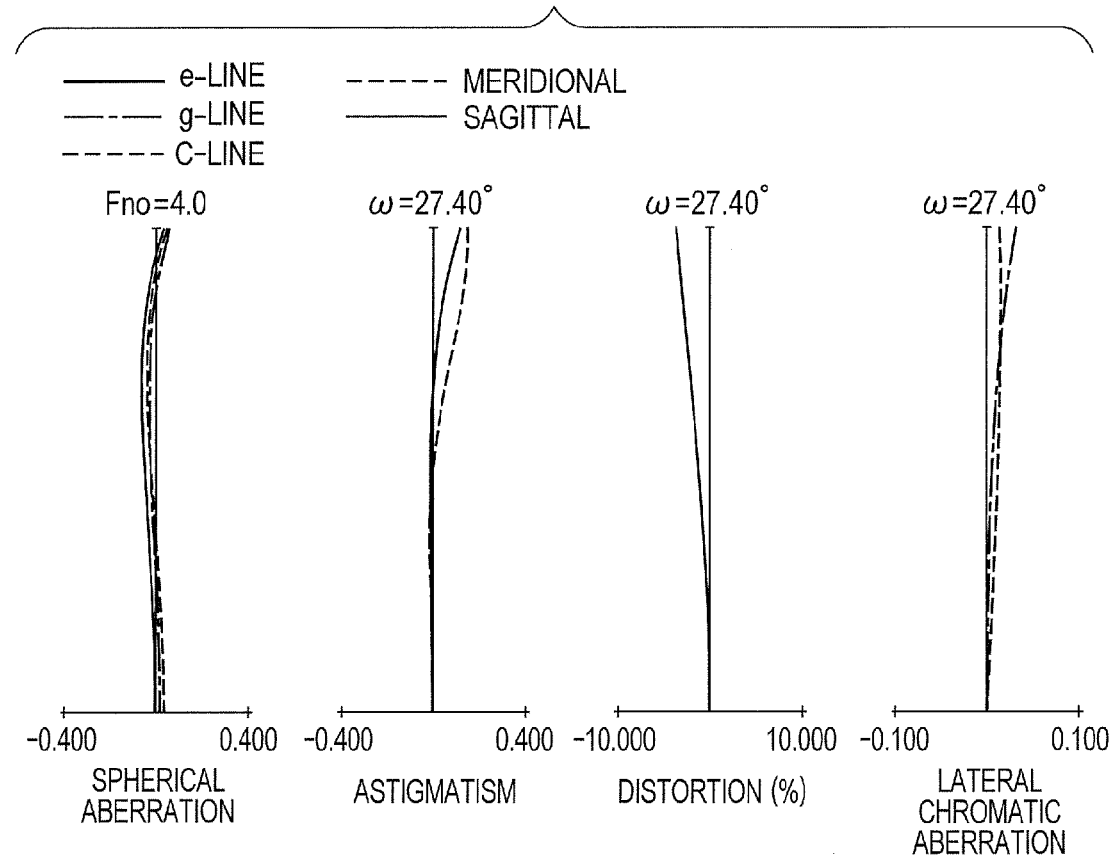
FIG. 10A is an aberration diagram when the infinite object is focused at the wide-angle end of Numerical Embodiment 5.
Figure 10B:
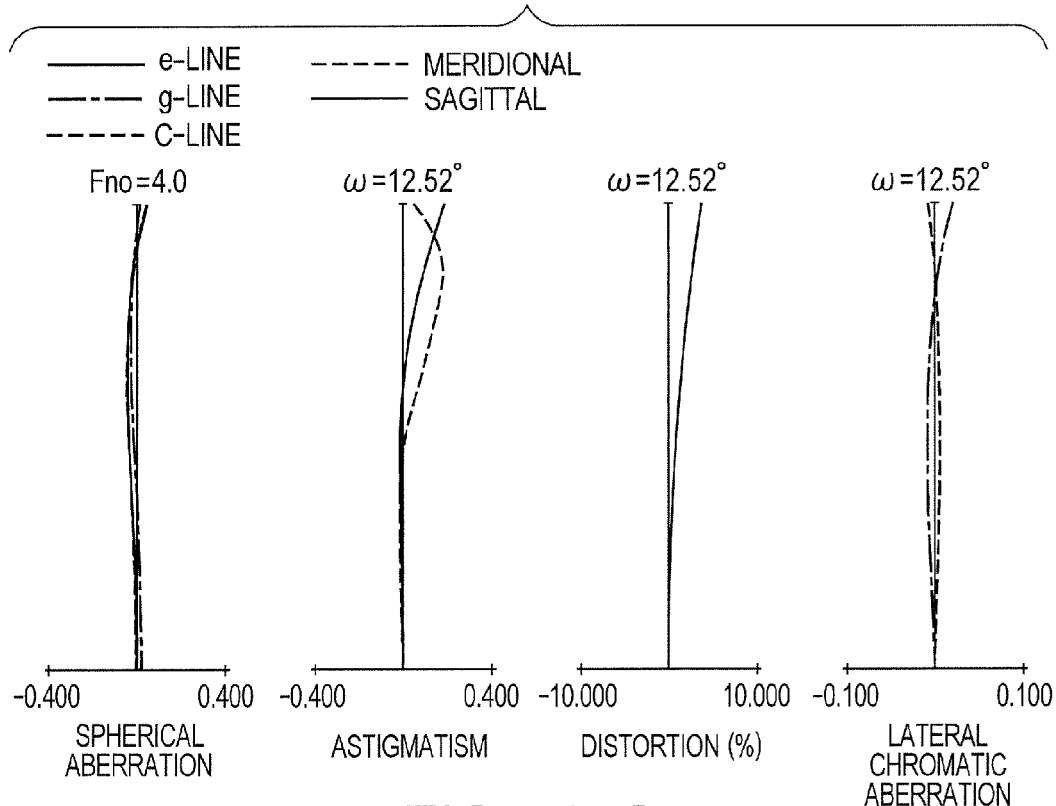
FIG. 10B is an aberration diagram when the infinite object is focused at an intermediate zoom position of Numerical Embodiment 5.
Figure 10C:
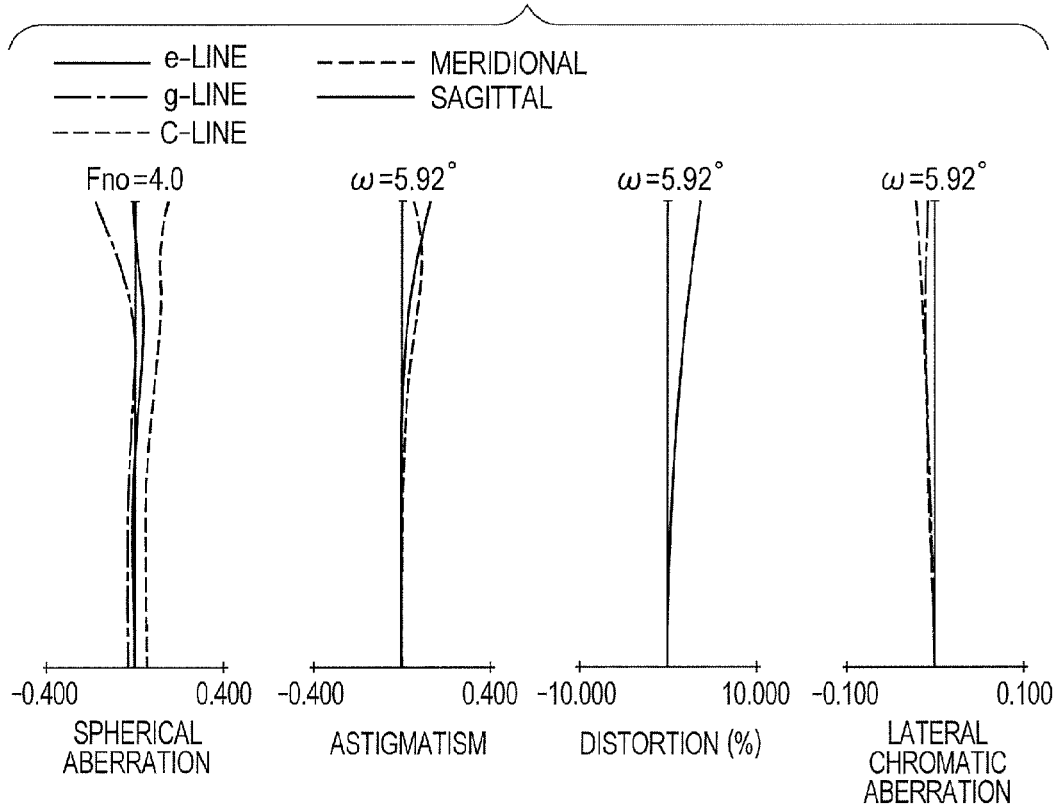
FIG. 10C is an aberration diagram when the infinite object is focused at a telephoto end of Numerical Embodiment 5.

FIG. 9 is a lens sectional view when an infinite object is focused at a wide-angle end (focal length f=30.00 mm) of a zoom lens of Embodiment 5 (Numerical Embodiment 5) of the present invention. FIGS. 10A, 10B, and 10C are aberration diagrams when the infinite object is focused at the wide-angle end, an intermediate zoom position (focal length f=70.00 mm), and a telephoto end (focal length f=150.00 mm), respectively, of Numerical Embodiment 5.

Figure 11:
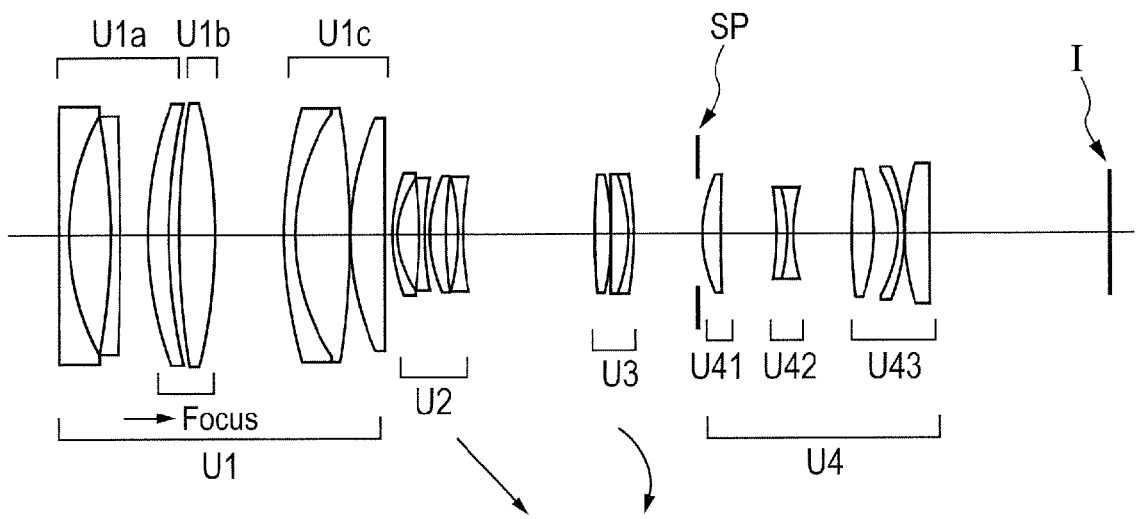
FIG. 11 is a lens sectional view when an infinite object is focused at a wide-angle end of Numerical Embodiment 6.
Figure 12A:
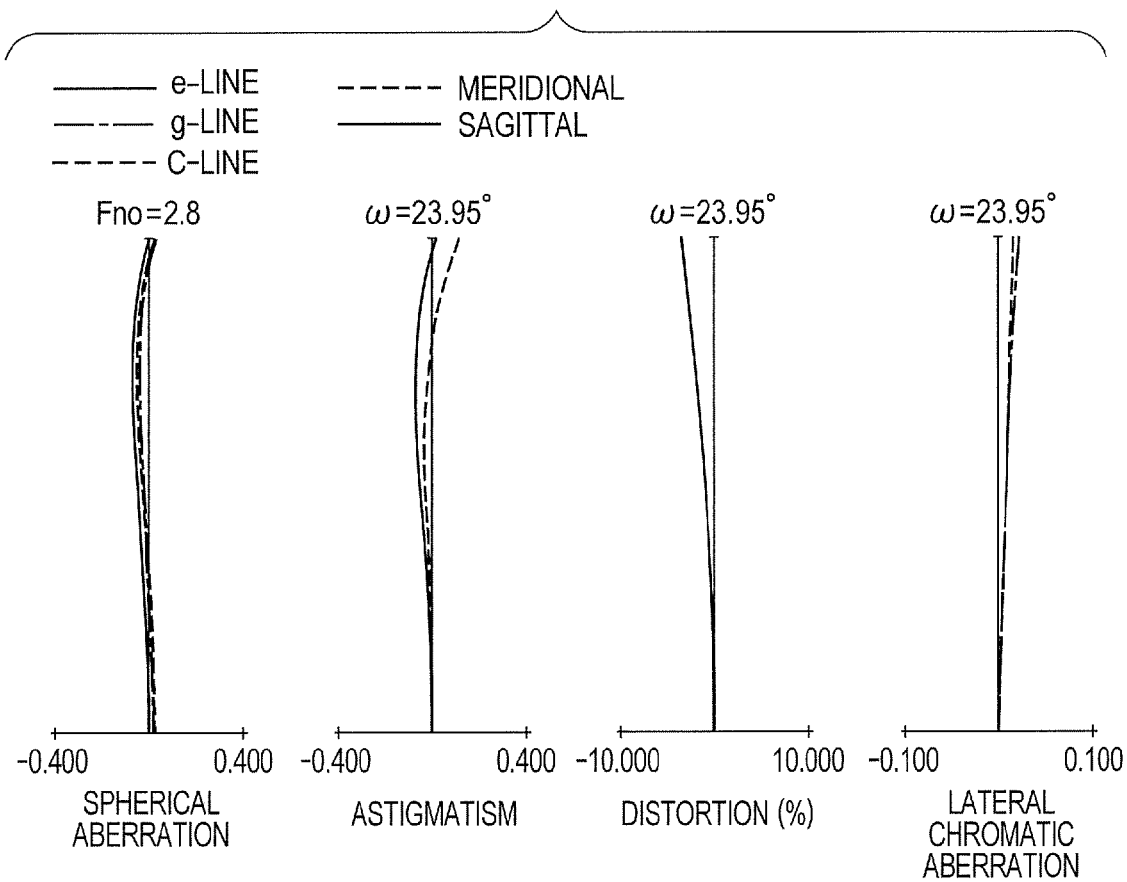
FIG. 12A is an aberration diagram when the infinite object is focused at the wide-angle end of Numerical Embodiment 6.
Figure 12B:
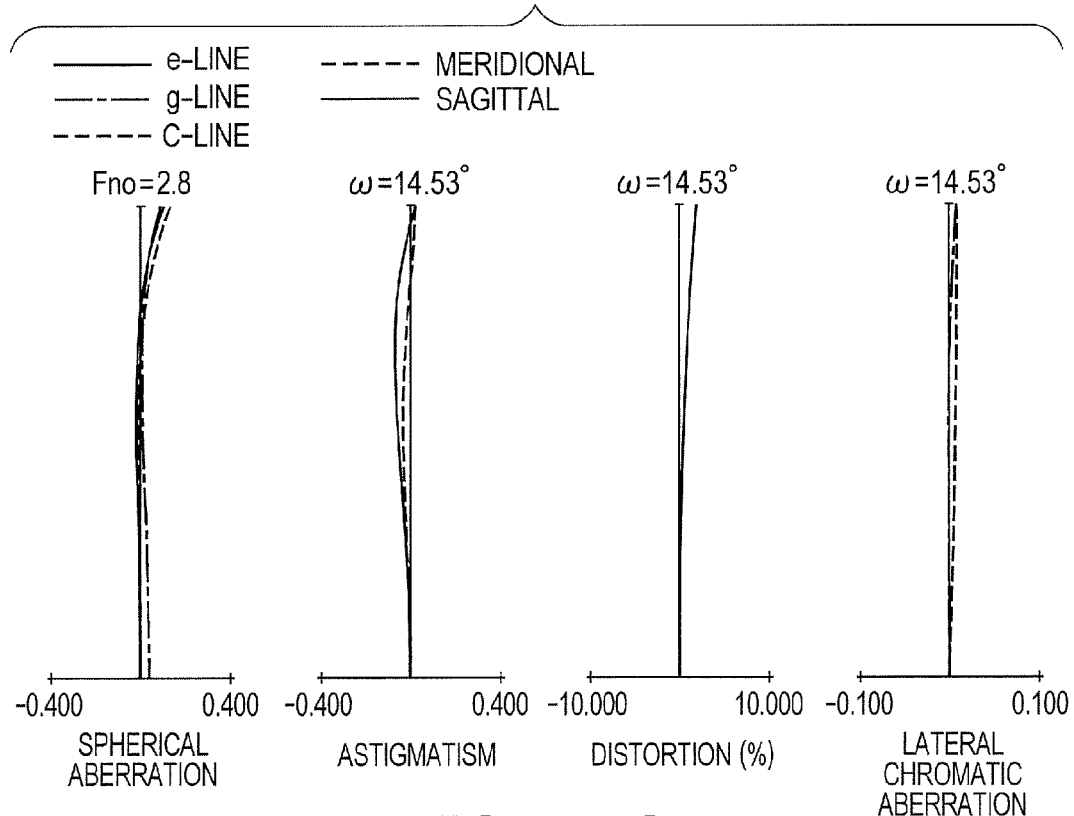
FIG. 12B is an aberration diagram when the infinite object is focused at an intermediate zoom position of Numerical Embodiment 6.
Figure 12C:
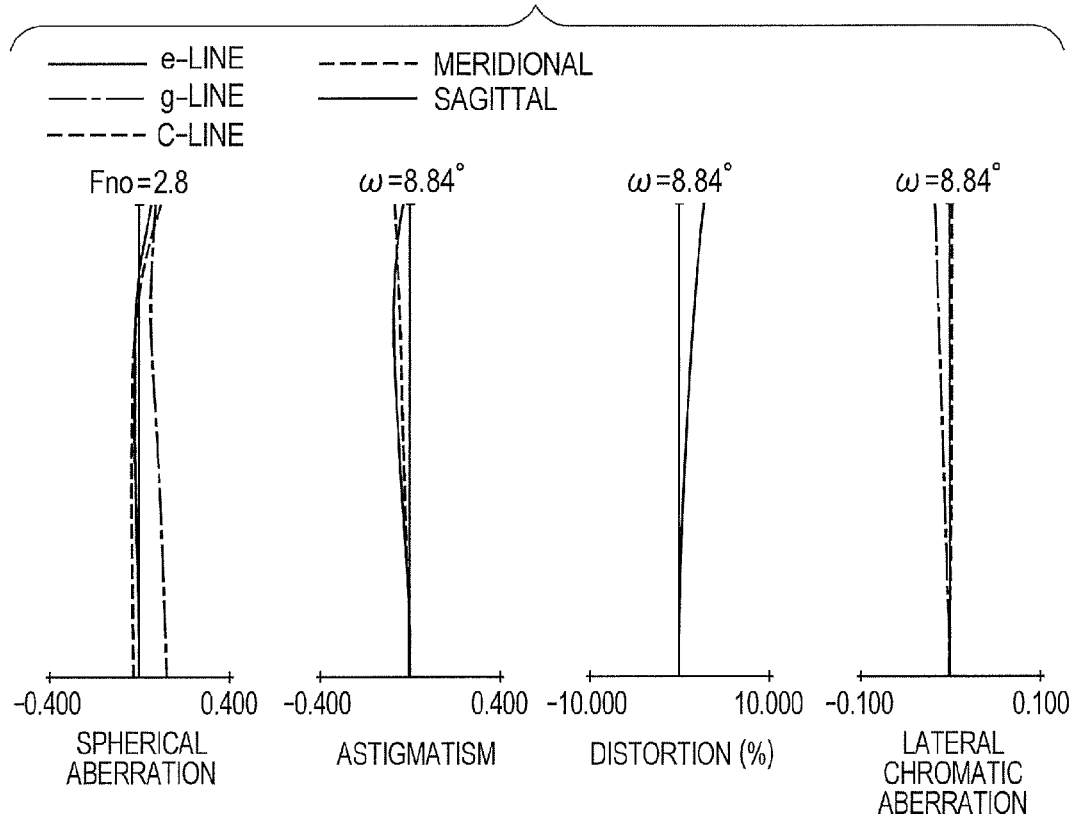
FIG. 12C is an aberration diagram when the infinite object is focused at a telephoto end of Numerical Embodiment 6.

FIG. 11 is a lens sectional view when an infinite object is focused at a wide-angle end (focal length f=35.00 mm) of a zoom lens of Embodiment 6 (Numerical Embodiment 6) of the present invention. FIGS. 12A, 12B, and 12C are aberration diagrams when the infinite object is focused at the wide-angle end, an intermediate zoom position (focal length f=60.00 mm), and a telephoto end (focal length f=100.00 mm), respectively, of Numerical Embodiment 6.

Figure 13:
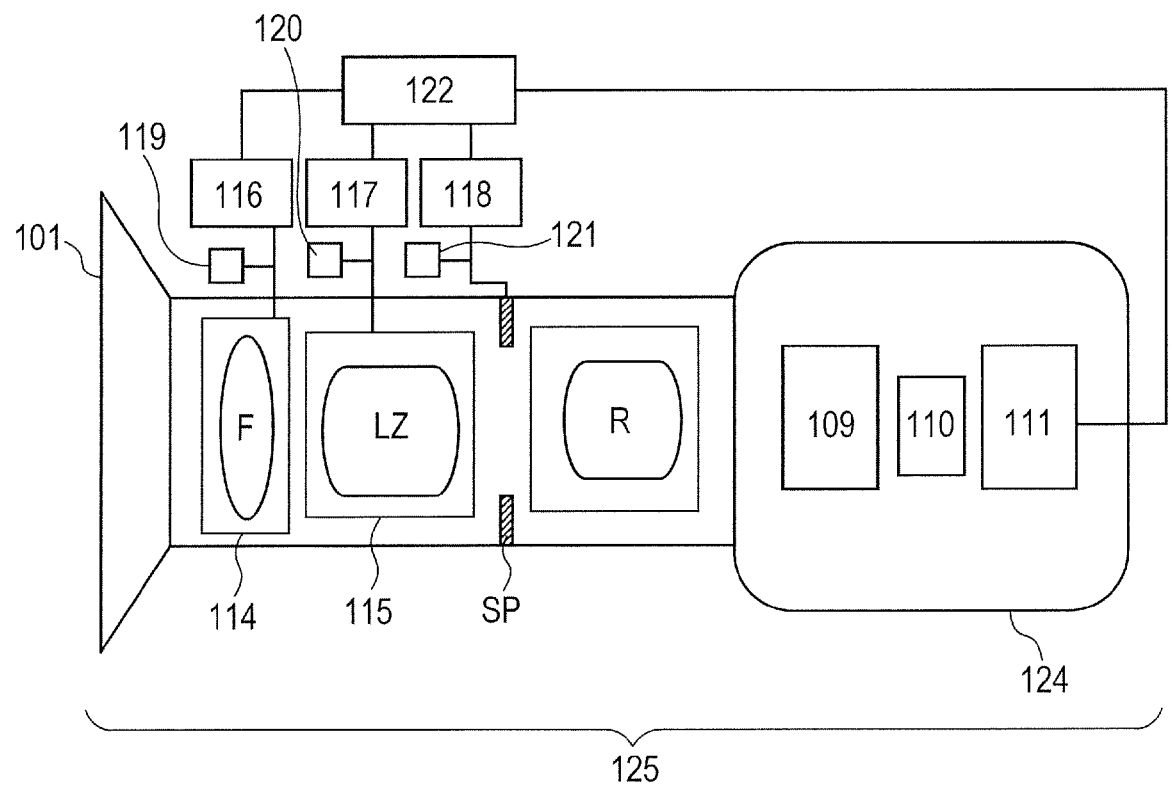
FIG. 13 is a schematic view showing main parts of an image pickup apparatus of the present invention.
Figure 14:
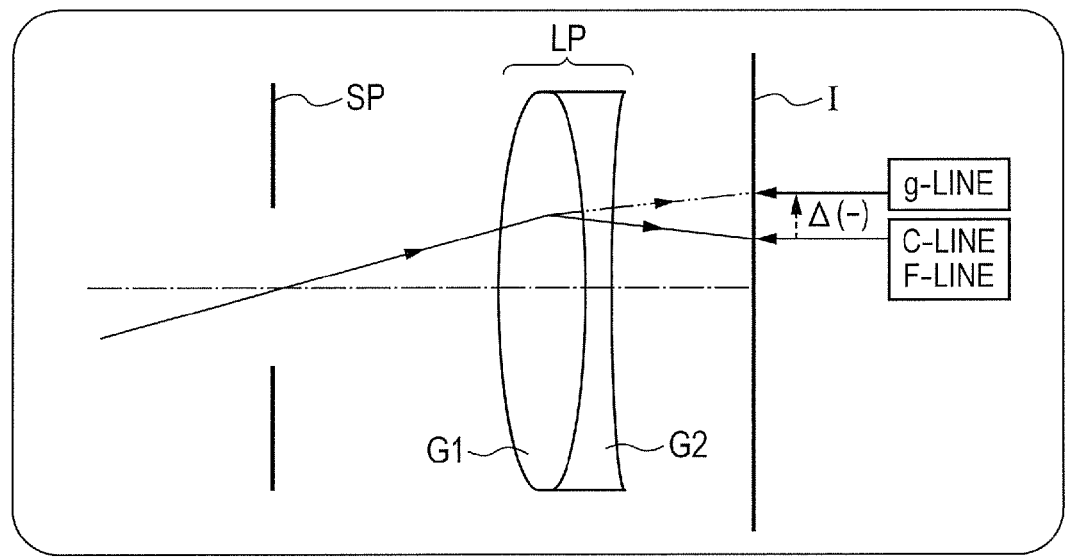
FIG. 14 is a schematic view showing two-color achromatism by a lens unit having a positive refractive power and a residual secondary spectrum.
Figure 15:
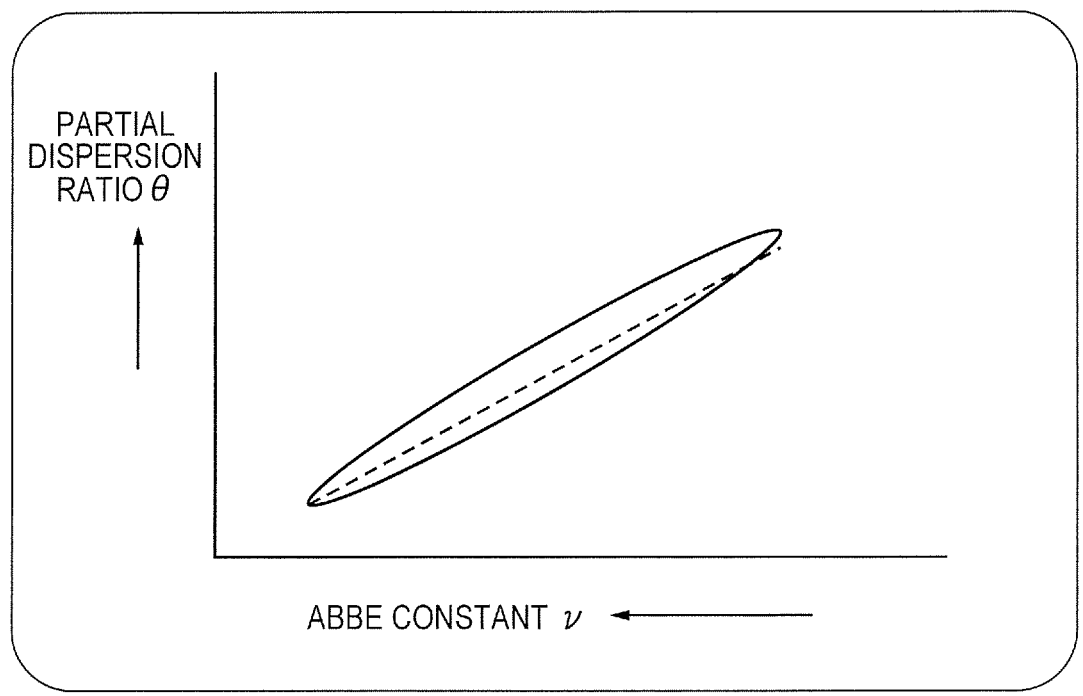
FIG. 15 is a schematic view showing the distributions of an Abbe constant ν and partial dispersion ratio θ of an optical material.

FIG. 13 is a schematic view showing main components of an image pickup apparatus of the present invention. FIG. 14 is a schematic view showing two-color achromatism for a lateral chromatic aberration of a lens unit LP having a positive refractive power and positioned between an aperture stop and image plane I, and a residual secondary spectrum. FIG. 15 is a schematic view showing the distributions of an Abbe constant ν and partial dispersion ratio θ of a general optical material.

In each lens sectional view, the left side is a subject (object) side (front side), and the right side is an image side (rear side). In the lens sectional view, the zoom lens includes a first lens unit U1 (front lens unit) that does not move for zooming and has a positive refractive power. The first lens unit U1 includes, in order from the object side to the image side, a 1a lens group U1a that does not move for focusing, a 1b lens group U1b for focusing, and a 1c lens group U1c that does not move for focusing. The 1b lens unit U1b moves toward the image side as indicated by an arrow Focus in FIG. 1 when performing focusing from an infinite object to a short distance object.

The zoom lens includes a second lens unit U2 that moves during zooming and has a negative refractive power, and a third lens unit U3 that moves during zooming and has a positive refractive power. Moving the third lens unit allows to correct the image plane variation caused by zooming. The zoom lens includes a fourth lens unit U4 (relay lens unit) (imaging unit) that does not move for zooming and has a positive refractive power. Note that "a lens unit" and "lens group" herein mentioned need only include at least one lens, and need not always include a plurality of lenses.

When performing zooming from the wide-angle end to the telephoto end, the second lens unit U2 moves to the image side as indicated by the arrow shown in FIG. 1. When performing zooming from the wide-angle end to the telephone end, the third lens unit U3 moves along a locus projecting toward the image side. That is, when performing zooming from the wide-angle end to the telephoto end, the third lens unit U3 first moves toward the image side and then moves toward the object side by reversing the direction at a given zoom position. Lenses forming the fourth lens unit U4 are divided into three lens units from the longest air interval and second longest air interval in the fourth lens unit U4.

In this arrangement, the fourth lens unit U4 includes, in order from the object side to the image side, a 41 lens group U41 having a positive refractive power, a 42 lens group U42 having a negative refractive power, and a 43 lens group U43 having a positive refractive power. The second and third lens units U2 and U3 form a zooming system (zooming unit). SP is a stop (aperture stop) positioned between the third lens unit U3 and fourth lens unit U4.

The zoom lens includes an imaging plane I (image plane). When using the apparatus as an image pickup system of a broadcasting television camera, video camera, or digital still camera, the imaging plane I is equivalent to the imaging plane of, e.g., a solid-state image sensor (photoelectric transducer) that receives an image formed by a zoom lens and photoelectrically converts the received image. When using the apparatus as an image pickup optical system of a film camera, the imaging plane I is equivalent to a film surface to be exposed to an image formed by a zoom lens.

In the aberration diagrams, the solid line, alternate long and short dashed line, and dotted line of a spherical aberration respectively correspond to an e-line, g-line, and C-line. The dotted line and solid line of astigmatism respectively correspond to a meridional image plane and sagittal image plane. The alternate long and short dashed line and dotted line of a lateral chromatic aberration respectively correspond to a g-line and C-line. ω corresponds to a half angle of field (half angle of shooting field) (unit: degree). Fno corresponds to an f-number. Note that in each of the following embodiments, a state in which the second and third lens units U2 and U3 of the zoom system are arranged at the shortest focal length will be called a wide-angle end, and a state in which they are arranged at the longest focal length will be called a telephoto end.

In each embodiment, the 42 lens group U42 has one or more positive lenses and one or more negative lenses. Let $\beta 3w$ be the lateral magnification of the third lens unit U3 at the wide-angle end when an infinite object is focused. Let f4 be the focal length of the fourth lens unit U4, and Ld4 be the length on the optical axis from the most object side lens surface to the most image side lens surface of the fourth lens unit U4. Let Ld41 be the air interval between the 41 lens group U41 and the 42 lens group U42. Let Ld42 be the air interval between the 42 lens group U42 and the 43 lens group U43.

Let f42 be the focal length of the 42 lens group U42, and ν42p and θ42p be the average value of the Abbe constants and the average value of the partial dispersion ratios, respectively, of the materials of the positive lenses included in the 42 lens group U42. Let ν42n and θ42n be the average value of the Abbe constants and the average value of the partial dispersion ratios, respectively, of the materials of the negative lenses included in the 42 lens group U42. In this state, conditions represented by the following expressions are satisfied.

$$-0.50 < 1/\beta 3w < 0.50 \tag{1}$$

$$0.20 < |f42/f4| < 0.90 \tag{2}$$

$$0.10 < Ld41/Ld4 < 0.40 \tag{3}$$

$$0.10 < Ld42/Ld4 < 0.40 \tag{4}$$

$$-6.00 \times 10^{-3} < (\theta 42p - \theta 42n)/(\nu 42p - \nu 42n) < -2.50 \times 10^{-3} \tag{5}$$

Note that if only one positive lens (negative lens) is included, the average value of the Abbe constants and the average value of the partial dispersion ratios of materials are the values of the material of the one positive lens (negative lens).

Hereinafter, the technical meanings of the above-described conditional expressions will be explained. Conditional expression (1) is related to the lateral magnification of the third lens unit U3 at the wide-angle end, and defines the exit angle of a light beam exiting from the third lens unit U3. In the zoom lens of each embodiment, the exit angle of the third lens unit U3 is an important element for suppressing various aberrations over the entire zoom range and reducing the number of lenses. Satisfying conditional expression (1) facilitates well correcting various aberrations while reducing the number of lenses forming the fourth lens unit U4.

If $1/\beta 3w$ is equal to or greater than the upper limit or is equal to or smaller than the lower limit of conditional expression (1), the light beam exiting from the third lens unit U3 deviates from afocal, and converges or diverges. This makes it necessary to increase the number of lenses in order to well correct various aberrations by the fourth lens unit U4.

Conditional expression (2) defines the ratio of the focal length of the 42 lens group U42 to that of the fourth lens unit U4. In the zoom lens of each embodiment, properly setting the ratio of the focal length of the 42 lens group U42 to that of the fourth lens unit U4 is an important factor for suppressing a lateral chromatic aberration, an image plane curvature, and various off-axis aberrations at the wide-angle end. Satisfying conditional expression (2) effectively corrects a lateral chromatic aberration and various aberrations by the 42 lens group U42.

If |f42/f4| is equal to or smaller than the lower limit of conditional expression (2), the negative refractive power of the 42 lens group U42 becomes too large and makes an image plane curvature and various aberrations difficult to correct. If

|f42/f4| is equal to or greater than the upper limit of conditional expression (2), the negative refractive power of the 42 lens group U42 becomes too small and makes a lateral chromatic aberration and various aberrations difficult to correct.

Conditional expression (3) defines the ratio of the air interval Ld41 between the 41 lens group U41 and the 42 lens group U42 to the lens length Ld4 of the fourth lens unit U4. In the zoom lens of each embodiment, properly setting the ratio of the length Ld41 to the length Ld4 is an important factor for well correcting various aberrations at the wide-angle end by using a small number of lenses. Satisfying conditional expression (3) properly sets the lens interval Ld41 between the 41 lens group U41 and the lens group U42, clarifies the role played by each lens unit of the fourth lens unit U4 for aberration correction, and facilitates forming the lens unit with a smaller number of lenses.

If Ld41/Ld4 is equal to or greater than the upper limit of conditional expression (3), the interval Ld41 between the 41 lens group U41 and the 42 lens group U42 increases, and the refractive power of the 42 lens group U42 decreases. This makes it difficult to correct a lateral chromatic aberration and various off-axis aberrations such as an image plane curvature. If Ld41/Ld4 is equal to or smaller than the lower limit of conditional expression (3), the 42 lens group U42 moves closer to the aperture stop SP, and this makes a lateral chromatic aberration and various off-axis aberrations such as an image plane curvature difficult to correct.

Conditional expression (4) defines the ratio of the air interval Ld42 between the 42 lens group U42 and the 43 lens group U43 to the lens length Ld4 of the fourth lens unit U4. In the zoom lens of each embodiment, properly setting the ratio of the length Ld42 to the length Ld4 is an important factor for well correcting various aberrations at the wide-angle end by using a small number of lenses. Satisfying conditional expression (4) properly sets the lens interval Ld42 between the 42 lens group U42 and the 43 lens group U43, clarifies the role played by each lens unit of the fourth lens unit U4 for aberration correction, and facilitates forming the lens unit with a smaller number of lenses.

If Ld42/Ld4 is equal to or greater than the upper limit of conditional expression (4), the 42 lens group U42 moves closer to the aperture stop SP, and this makes it difficult to correct a lateral chromatic aberration and various off-axis aberrations such as an image plane curvature. If Ld42/Ld4 is equal to or smaller than the lower limit of conditional expression (4), the interval Ld42 between the 42 lens group U42 and the 43 lens group U43 decreases, and the exit pupil position moves closer to the imaging plane. Consequently, an angled light beam enters the imaging plane. This undesirably generates many shadings.

Conditional expression (5) is a condition for mainly properly correcting the secondary spectrum of a lateral chromatic aberration at the wide-angle end. In the zoom lens of each embodiment, the dispersion characteristic of the material of the lens of the fourth lens unit U4 is an important element for well correcting a lateral chromatic aberration at the wide-angle end. Satisfying conditional expression (5) effectively corrects a lateral chromatic aberration at the wide-angle end by the 42 lens group U42.

If $(\theta42p-\theta42n)/(\nu42p-\nu42n)$ is equal to or greater than the upper limit of conditional expression (5), the effect of correcting the secondary spectrum of a lateral chromatic aberration at the wide-angle end decreases, and the correction becomes insufficient. If $(\theta42p-\theta42n)/(\nu42p-\nu42n)$ is equal to or smaller than the lower limit of conditional expression (5), the secondary spectrum of an on-axis chromatic aberration is excessively corrected at the wide-angle end. In each embodiment, it is more favorable to set the numerical ranges of conditional expressions (1) to (5) as follows.

$$-0.40 < 1/\beta3w < 0.10 \tag{1a}$$

$$0.30 < |f42/f4| < 0.70 \tag{2a}$$

$$0.15 < Ld41/Ld4 < 0.25 \tag{3a}$$

$$0.15 < Ld42/Ld4 < 0.25 \tag{4a}$$

$$-4.50 \times 10^{-3} < (\theta42p-\theta42n)/(\nu42p-\nu42n) < -3.00 \times 10^{-3} \tag{5a}$$

Hereinafter, the correction of a chromatic aberration in the zoom lens of the present invention will be explained.

FIG. 14 is a schematic view showing two-color achromatism and the residual amount of a secondary spectrum in a lateral chromatic aberration by the lens unit LP having a positive refractive power and positioned between the aperture stop SP and image plane I. FIG. 15 is a schematic view showing the distributions of the Abbe constant ν and partial dispersion ratio θ of the existing optical material. Letting Ng be a refractive index on the g-line, NF be that on the F-line, Nd be that on the d-line, and NC be that on the C-line, the Abbe constant ν and partial dispersion ratio θ are represented by the following equations.

$$\nu = (Nd-1)/(NF-NC) \tag{A}$$

$$\theta = (Ng-NF)/(NF-NC) \tag{B}$$

As shown in FIG. 15, the partial dispersion ratio θ of the existing optical material distributes in a range narrower than that of the Abbe constant ν, and increases as the Abbe constant ν decreases.

A condition for correcting a chromatic aberration of a thin-walled system (a synthetic refractive power φ) including two lenses G1 and G2 having refractive powers φ1 and φ2 and made of materials having Abbe constants ν1 and ν2 is represented by $$\phi1/\nu1 + \phi2/\nu2 = E \tag{C}$$

where $$\phi = \phi1 + \phi2 \tag{D}$$

When E=0 in equation (C), the imaging positions of the C-line-F-line match.

Referring to FIG. 14, for the achromatic lens unit LP having a positive refractive power, a material having a large Abbe constant ν1 is used as the positive lens G1, and a material having a small Abbe constant ν2 is used as the negative lens G2. As shown in FIG. 15, therefore, the partial dispersion ratio θ1 of the material of the positive lens G1 decreases, and the partial dispersion ratio θ2 of the material of the negative lens G2 increases. Consequently, the imaging point of the g-line deviates from the optical axis when chromatic aberrations are corrected on the F-line and C-line. When this deviation amount is defined as a secondary spectrum amount Δ, the deviation is represented by $$\Delta = -(1/\phi) \cdot (\theta1-\theta2)/(\nu1-\nu2) \tag{E}$$

In order to suppress an aberration variation caused by zooming of a zoom lens, the imaging point of the g-line is normally shifted away from the optical axis in a zoom position at the wide-angle end, and shifted close to the optical axis in a zoom position at the telephoto end. In the fourth lens unit U4 closer to the image side than the aperture stop SP, the lens unit having a positive refractive power is formed by selecting a glass material that decreases the secondary spectrum amount Δ, and the lens unit having a negative refractive power is formed by selecting a glass material that increases the secondary spectrum amount Δ. This makes it possible to correct the secondary spectrum of a lateral chromatic aberration at the wide-angle end.

By satisfying the conditions described above, each embodiment implements a small-sized lightweight zoom lens in which aberration correction is well performed over the entire zoom range. In each embodiment, it is more preferable to satisfy one or more of the following conditions. Let f1, f2, and f3 be the focal lengths of the first, second, and third lens units U1, U2, and U3, respectively. Let f41 and f43 be the focal lengths of the 41 and 43 lens groups U41 and U43, respectively.

The 43 lens group U43 includes one or more positive lenses and one or more negative lenses. Let ν43p and θ43p be the average value of the Abbe constants and the average value of the partial dispersion ratios, respectively, of the materials of the positive lenses included in the 43 lens group U43. Let ν43n and θ43n be the average value of the Abbe constants and the average value of the partial dispersion ratios, respectively, of the materials of the negative lenses included in the 43 lens group U43. Let n42p be the average value of the refractive indices of the materials of the positive lenses included in the 42 lens group U42, and n42n be the average value of the refractive indices of the materials of the negative lenses included in the 42 lens group U42. Under the conditions, it is favorable to satisfy one or more of the following conditional expressions.

$$1.50 < |f1/f2| < 3.20 \tag{6}$$

$$0.20 < |f2/f3| < 0.50 \tag{7}$$

$$1.00 < |f41/f42| < 2.50 \tag{8}$$

$$0.90 < |f43/f42| < 2.00 \tag{9}$$

$$-2.50 \times 10^{-3} < (\theta 43p - \theta 43n)/(\nu 43p - \nu 43n) < -1.00 \times 10^{-3} \tag{10}$$

$$0.00 < n42p - n42n < 0.40 \tag{11}$$

Hereinafter, the technical meanings of the above-described conditional expressions will be explained.

Conditional expression (6) defines the ratio of the focal length of the first lens unit U1 to that of the second lens unit U2. If |f1/f2| is equal to or greater than the upper limit of conditional expression (6), the focal length of the first lens unit U1 becomes longer than that of the second lens unit U2. Consequently, the lens effective aperture of the first lens unit U1 increases, and this makes a wide angle of field difficult to obtain. If |f1/f2| is equal to or smaller than the lower limit of conditional expression (6), the focal length of the first lens unit U1 becomes shorter than that of the second lens unit U2. This makes it difficult to suppress variations in various off-axis aberrations at the wide-angle end during zooming. It is particularly difficult to suppress distortion and an image plane curvature.

Conditional expression (7) defines the ratio of the focal length of the second lens unit U2 to that of the third lens unit U3. If |f2/f3| is equal to or greater than the upper limit of conditional expression (7), the focal length of the third lens unit U3 becomes shorter than that of the second lens unit U2, and an aberration variation caused by zooming increases in the third lens unit U3. In order to suppress this variation, the number of lenses of the third lens unit U3 must be increased. If |f2/f3| is equal to or smaller than the lower limit of conditional expression (7), the focal length of the third lens unit U3 becomes longer than that of the second lens unit U2, and the moving amount of the third lens unit U3 increases in order to suppress an image plane variation caused by zooming.

Conditional expression (8) defines the ratio of the focal length of the 41 lens group U41 to that of the 42 lens group U42. If |f41/f42| is equal to or greater than the upper limit of conditional expression (8), the focal length of the 41 lens group U41 becomes longer than that of the 42 lens group U42, and this makes a spherical aberration difficult to correct at the wide-angle end. If |f41/f42| is equal to or smaller than the lower limit of conditional expression (8), the focal length of the 42 lens group U42 becomes longer than that of the 41 lens group U41, and this makes a lateral chromatic aberration and various off-axis aberrations difficult to correct at the wide-angle end.

Conditional expression (9) defines the ratio of the focal length of the 43 lens group U43 to that of the 42 lens group U42. If |f43/f42| is equal to or greater than the upper limit of conditional expression (9), the focal length of the 43 lens group U43 becomes longer than that of the 42 lens group U42, and this makes a lateral chromatic aberration and various off-axis aberrations difficult to correct at the wide-angle end. If |f43/f42| is equal to or smaller than the lower limit of conditional expression (9), the focal length of the 42 lens group U42 becomes longer than that of the 43 lens group U43, and this makes a lateral chromatic aberration and various off-axis aberrations difficult to correct at the wide-angle end.

Conditional expression (10) is a condition for properly correcting the secondary spectrum of a lateral chromatic aberration at the wide-angle end. Since the 43 lens group U43 has a positive refractive power, the secondary spectrum of a lateral chromatic aberration is readily corrected at the wide-angle end by decreasing the secondary spectrum amount Δ of expression (E) as described previously.

If $(\theta 43p - \theta 43n)/(\nu 43p - \nu 43n)$ is equal to or greater than the upper limit of conditional expression (10), the secondary spectrum amount Δ decreases, and this facilitates correcting the secondary spectrum of a lateral chromatic aberration at the wide-angle end. However, the secondary spectrum of a lateral chromatic aberration increases at the telephoto end becomes difficult to correct. If $(\theta 43p - \theta 43n)/(\nu 43p - \nu 43n)$ is equal to or smaller than the lower limit of conditional expression (10), the secondary spectrum amount Δ increases, and this makes the secondary spectrum of a lateral chromatic aberration difficult to correct at the wide-angle end.

Conditional expression (11) defines the difference between the refractive index of the material of the positive lens and that of the material of the negative lens in the 42 lens group U42. If n42p−n42n is equal to or greater than the upper limit of conditional expression (11), the refractive index of the material of the negative lens becomes smaller than that of the material of the positive lens, and this makes an image plane curvature and various off-axis aberrations difficult to correct. If n42p−n42n is equal to or smaller than the lower limit of conditional expression (11), the Petzval sum is insufficiently corrected, and this makes an image plane curvature difficult to correct. The numerical ranges of conditional expressions (6) to (11) are more preferably set as follows.

$$1.70 < |f1/f2| < 3.00 \tag{6a}$$

$$0.25 < |f2/f3| < 0.45 \tag{7a}$$

$$1.50 < |f41/f42| < 1.90 \tag{8a}$$

$$0.99 < |f43/f42| < 1.70 \tag{9a}$$

$$-1.68 \times 10^{-3} < (\theta 43p - \theta 43n)/(\nu 43p - \nu 43n) < -4.00 \times 10^{-4} \tag{10a}$$

$$0.05 < n42p - n42n < 0.18 \tag{11a}$$

In order to correct an image plane curvature, the Petzval sum must be decreased.

Letting III be the coefficient of astigmatism, P be the Petzval sum, and ω be a half angle of field, a meridional image plane ΔM, and a sagittal image plane ΔS are given by the following equations.

$$\Delta M = -\frac{1}{2}(3III+P) \times (\tan \omega)^2 \quad \text{(F)}$$

$$\Delta S = -\frac{1}{2}(III+P) \times (\tan \omega)^2 \quad \text{(G)}$$

In equations (F) and (G), an image plane curvature remaining when coefficient III=0 is a Petzval image plane. Letting φ be the refractive power of each lens and N be the refractive index of the lens, the Petzval sum P is given by the following equation.

$$P = \Sigma(\phi/N) \quad \text{(H)}$$

When coefficient III=0 and P=0 in equations (F) to (H), it is possible to simultaneously correct the image plane curvature of the meridional image plane and that of the sagittal image plane.

In the zoom lens of the present invention, the number of lens units having a positive refractive power is large. Therefore, the Petzval sum is decreased by increasing the refractive index of the material of the positive lenses, and decreasing that of the material of the negative lenses. In each embodiment, the 42 lens group U42 preferably includes a cemented lens obtained by cementing a positive lens having a convex surface on the object side and a negative lens having a concave surface on the image side. Alternatively, the 42 lens group U42 preferably includes a cemented lens obtained by cementing a positive lens having a concave surface on the object side and a negative lens having a concave surface on the image side. This facilitates correcting a spherical aberration, a lateral chromatic aberration, and various off-axis aberrations such as an image plane curvature at the wide-angle end.

Also, in each embodiment, the lenses of the 43 lens group U43 are preferably arranged in the order of a positive lens, negative lens, and positive lens from the object side to the image side. Alternatively, the lenses of the 43 lens group U43 are preferably arranged in the order of a positive lens and negative lens from the object side to the image side. This facilitates suppressing various off-axis aberrations, particularly, facilitates correcting an image plane curvature at the wide-angle end.

Hereinafter, the features of the lens configuration of each embodiment will be explained. When lenses are counted from the object side to the image side, the first lens unit U1 of Embodiment 1 corresponds to the first to 17th lens surfaces. The second lens unit U2 corresponds to the 18th to 24th lens surfaces. The third lens unit U3 corresponds to the 25th to 29th lens surfaces. The fourth lens unit U4 corresponds to the 30th to 40th lens surfaces. The aperture stop SP (the 30th surface) is regarded as a part of the fourth lens unit U4. This similarly applies to each of the following embodiments.

When performing zooming from the wide-angle end to the telephoto end, the second lens unit U2 linearly moves to the image side, and the third lens unit U3 almost reciprocates by drawing a locus projecting toward the image side. Also, the refractive powers of the lens units and the layout of the lens units are set such that a light beam exiting from the third lens unit U3 forms an almost afocal light beam. This facilitates reducing the number of lenses forming the fourth lens unit U4. In addition, the aberration distribution in the third lens unit U3 becomes almost constant as zooming advances, and this facilitates reducing aberrations in the entire zoom range.

The zoom lens of this embodiment decreases an aberration variation during zooming, and facilitates reducing aberrations in the entire zoom range by suppressing aberrations at the wide-angle end. The 41 and lens groups U41 and U42 mainly correct a spherical aberration and on-axis chromatic aberration at the wide-angle end. The 42 and 43 lens groups U42 and U43 correct a lateral chromatic aberration, an image plane curvature, and various off-axis aberrations.

As shown in Table 1 (to be described later), Numerical Embodiment 1 satisfies all conditional expressions (1) to (11), and achieves a wide angle of shooting field (angle of field) of 63.76° at the wide-angle end at a high zoom ratio of ×2.60. In addition, a high optical performance is obtained by well correcting various aberrations over the entire zoom range.

In Embodiment 2, the first lens unit U1 corresponds to the first to 15th lens surfaces. The second lens unit U2 corresponds to the 16th to 23rd lens surfaces. The third lens unit U3 corresponds to the 24th to 28th lens surfaces. The fourth lens unit U4 corresponds to the 29th to 39th lens surfaces. The optical actions of these lens units are the same as those of Embodiment 1.

As shown in Table 1 (to be described later), Numerical Embodiment 2 satisfies all conditional expressions (1) to (11), and achieves a wide angle of shooting field (angle of field) of 54.80° at the wide-angle end at a high zoom ratio of ×2.67. In addition, a high optical performance is obtained by well correcting various aberrations over the entire zoom range.

In Embodiment 3, the first lens unit U1 corresponds to the first to 16th lens surfaces. The second lens unit U2 corresponds to the 17th to 24th lens surfaces. The third lens unit U3 corresponds to the 25th to 29th lens surfaces. The fourth lens unit U4 corresponds to the 30th to 41st lens surfaces. The optical actions of these lens units are the same as those of Embodiment 1.

As shown in Table 1 (to be described later), Numerical Embodiment 3 satisfies all conditional expressions (1) to (11), and achieves a wide angle of shooting field (angle of field) of 42.48° at the wide-angle end at a high zoom ratio of ×3.00. In addition, a high optical performance is obtained by well correcting various aberrations over the entire zoom range.

In Embodiment 4, the first lens unit U1 corresponds to the first to 17th lens surfaces. The second lens unit U2 corresponds to the 18th to 25th lens surfaces. The third lens unit U3 corresponds to the 26th to 30th lens surfaces. The fourth lens unit U4 corresponds to the 31st to 42nd lens surfaces. The optical actions of these lens units are the same as those of Embodiment 1.

As shown in Table 1 (to be described later), Numerical Embodiment 4 satisfies all conditional expressions (1) to (11), and achieves a wide angle of shooting field (angle of field) of 38.12° at the wide-angle end at a high zoom ratio of ×3.11. In addition, a high optical performance is obtained by well correcting various aberrations over the entire zoom range.

In Embodiment 5, the first lens unit U1 corresponds to the first to 14th lens surfaces. The second lens unit U2 corresponds to the 15th to 21st lens surfaces. The third lens unit U3 corresponds to the 22nd to 26th lens surfaces. The fourth lens unit U4 corresponds to the 27th to 37th lens surfaces. The 21st lens surface has an aspherical shape. The 21st lens surface mainly corrects an image plane curvature at the wide-angle end. The optical actions of other lens units are the same as those of Embodiment 1.

As shown in Table 1 (to be described later), Numerical Embodiment 5 satisfies all conditional expressions (1) to (11), and achieves a wide angle of shooting field (angle of field) of 54.80° at the wide-angle end at a high zoom ratio of ×5.00. In addition, a high optical performance is obtained by well correcting various aberrations over the entire zoom range.

In Embodiment 6, the first lens unit U1 corresponds to the first to 13th lens surfaces. The second lens unit U2 corresponds to the 14th to 21st lens surfaces. The third lens unit U3 corresponds to the 22nd to 26th lens surfaces. The fourth lens unit U4 corresponds to the 27th to 38th lens surfaces. The optical actions of these lens units are the same as those of Embodiment 1.

As shown in Table 1 (to be described later), Numerical Embodiment 6 satisfies all conditional expressions (1) to (11), and achieves a wide angle of shooting field (angle of field) of 47.90° at the wide-angle end at a high zoom ratio of ×2.86. In addition, a high optical performance is obtained by well correcting various aberrations over the entire zoom range.

In each embodiment as described above, the refractive power layout of the lens units and the moving loci of the moving lens units for zooming are appropriately defined. This implements a zoom lens having a higher zoom ratio, a wideer angle of field, and a higher optical performance obtained by well correcting various aberrations.

FIG. 13 is a schematic view showing main parts of an image pickup apparatus using the zoom lens of any of Embodiments 1 to 6. In FIG. 13, reference numeral 101 denotes the zoom lens of any of Embodiments 1 to 6. Reference numeral 124 denotes a camera (camera body). The zoom lens 101 is detachable from the camera 124. Reference numeral 125 denotes an image pickup apparatus constructed by attaching the zoom lens 101 to the camera 124. The zoom lens 101 includes a focusing unit F, magnification-varying unit LZ, and imaging unit R. The focusing unit F includes a first lens unit U1.

The zooming unit LZ includes a second lens unit U2 that moves on the optical axis for zooming, and a third lens unit U3 that moves on the optical axis to correct an image plane variation caused by magnification-varying. The imaging unit R includes the fourth lens unit U4. Reference symbol SP denotes an aperture stop. Reference numerals 114 and 115 denote driving mechanisms such as helicoids or cams for driving the focusing unit F and magnification-varying unit LZ, respectively, in the optical axis direction.

Reference numerals 116 to 118 denote motors (driving means) for electrically driving the driving mechanisms 114 and 115 and aperture stop SP. Reference numeral 119 to 121 denote detectors such as encoders, potentiometers, or photosensors for detecting the positions of the focusing unit F and zooming unit LZ on the optical axis, and the stop diameter of the aperture stop SP. In the camera 124, reference numeral 109 denotes a glass block equivalent to an optical filter in the camera 124, and 110 denotes a solid-state image sensor (photoelectric transducer) such as a CCD sensor or CMOS sensor for receiving an object image formed by the zoom lens 101.

Also, reference numerals 111 and 122 denote CPUs (control means) for controlling various kinds of driving of the camera 124 and zoom lens 101. An image pickup apparatus having a high optical performance is implemented by thus applying the zoom lens of the present invention to the apparatus.

The preferred embodiments of the present invention have been explained above, but the present invention is, of course, not limited to these embodiments, and various modifications and changes can be made without departing from the spirit and scope of the invention.

Numerical Embodiments 1 to 6 corresponding to Embodiments 1 to 6 of the present invention will be presented below. In each numerical embodiment, i indicates the order of surfaces from the object side, ri indicates the curvature radius of the ith surface from the object side, di indicates the interval between the ith and (i+1)th surfaces from the object side, and ndi and vdi respectively indicate the refractive index and Abbe constant of the ith optical member. An aspherical surface is indicated by attaching a symbol * to the surface number. BF is Back Focus and indicates the distance from the last lens surface to the image plane. Table 1 shows the correspondence between the individual examples and the conditional expressions described above.

When the direction of the optical axis is the X-axis, the direction perpendicular to the optical axis is the H-axis, and the light propagation direction is positive, an aspherical shape is represented by the following expression by letting R be a paraxial curvature radius, k be a conic constant, and A4, A6, A8, A10, and A12 be aspherical coefficients. Also, "e-Z" means "$\times 10^{-Z}$".

NUMERICAL EXAMPLE 1

| | | | Unit: mm | | | | |
|---|---|---|---|---|---|---|---|
| | | | Surface data | | | | |
| Surface number | r | d | nd | vd | θgF | Effective aperture | Focal length |
| 1 | 113.35495 | 2.10000 | 1.772499 | 49.60 | 0.5521 | 62.167 | −84.555 |
| 2 | 41.22933 | 12.22908 | 1.000000 | 0.00 | 0.0000 | 54.489 | 0.000 |
| 3 | −380.22797 | 2.00000 | 1.589130 | 61.14 | 0.5406 | 54.058 | −131.963 |
| 4 | 98.39664 | 7.84168 | 1.000000 | 0.00 | 0.0000 | 52.642 | 0.000 |
| 5 | −92.86928 | 2.00000 | 1.589130 | 61.14 | 0.5406 | 52.633 | −222.909 |
| 6 | −316.72478 | 2.50000 | 1.000000 | 0.00 | 0.0000 | 53.594 | 0.000 |
| 7 | 105.42501 | 5.54987 | 1.805181 | 25.42 | 0.6161 | 57.774 | 148.201 |
| 8 | 825.97252 | 1.71834 | 1.000000 | 0.00 | 0.0000 | 58.025 | 0.000 |
| 9 | 160.20088 | 9.37829 | 1.496999 | 81.54 | 0.5374 | 59.154 | 122.738 |
| 10 | −97.05090 | 10.36281 | 1.000000 | 0.00 | 0.0000 | 59.275 | 0.000 |
| 11 | 161.98385 | 2.00000 | 1.805181 | 25.42 | 0.6161 | 55.212 | −83.312 |
| 12 | 47.48212 | 9.70418 | 1.496999 | 81.54 | 0.5374 | 53.020 | 99.816 |
| 13 | 969.23400 | 0.15372 | 1.000000 | 0.00 | 0.0000 | 52.875 | 0.000 |
| 14 | 86.41375 | 9.27635 | 1.487490 | 70.23 | 0.5300 | 52.555 | 106.410 |
| 15 | −126.27409 | 0.15372 | 1.000000 | 0.00 | 0.0000 | 51.902 | 0.000 |
| 16 | 64.28015 | 5.18222 | 1.729157 | 54.68 | 0.5444 | 47.224 | 123.534 |

-continued

| | | | Unit: mm | | | | |
|---|---|---|---|---|---|---|---|
| 17 | 214.49049 | (variable) | 1.000000 | 0.00 | 0.0000 | 45.879 | 0.000 |
| 18 | 154.04994 | 1.15291 | 1.772499 | 49.60 | 0.5521 | 24.596 | −40.274 |
| 19 | 25.90238 | 4.64707 | 1.000000 | 0.00 | 0.0000 | 22.567 | 0.000 |
| 20 | −76.38966 | 1.07605 | 1.589130 | 61.14 | 0.5406 | 22.637 | −35.603 |
| 21 | 29.22191 | 3.45874 | 1.846660 | 23.78 | 0.6034 | 23.277 | 38.757 |
| 22 | 233.70320 | 3.39659 | 1.000000 | 0.00 | 0.0000 | 23.278 | 0.000 |
| 23 | −27.39565 | 0.99919 | 1.589130 | 61.14 | 0.5406 | 23.321 | −88.730 |
| 24 | −58.09515 | (variable) | 1.000000 | 0.00 | 0.0000 | 24.239 | 0.000 |
| 25 | −143.82535 | 3.02257 | 1.589130 | 61.14 | 0.5406 | 25.120 | 138.124 |
| 26 | −52.50607 | 0.10376 | 1.000000 | 0.00 | 0.0000 | 25.713 | 0.000 |
| 27 | 70.73807 | 5.74776 | 1.496999 | 81.54 | 0.5374 | 26.247 | 48.232 |
| 28 | −35.43497 | 1.07605 | 1.834000 | 37.16 | 0.5775 | 26.236 | −74.678 |
| 29 | −82.65359 | (variable) | 1.000000 | 0.00 | 0.0000 | 26.592 | 0.000 |
| 30(stop) | ∞ | 6.80013 | 1.000000 | 0.00 | 0.0000 | 26.476 | 0.000 |
| 31 | 26.04181 | 4.38025 | 1.651597 | 58.55 | 0.5426 | 26.346 | 74.782 |
| 32 | 51.97292 | 6.78396 | 1.000000 | 0.00 | 0.0000 | 25.274 | 0.000 |
| 33 | 296.75559 | 3.92358 | 1.846660 | 23.78 | 0.6205 | 22.972 | 41.104 |
| 34 | −39.62446 | 1.03762 | 1.720467 | 34.70 | 0.5834 | 22.429 | −21.464 |
| 35 | 25.93030 | 10.00000 | 1.000000 | 0.00 | 0.0000 | 20.836 | 0.000 |
| 36 | 52.04781 | 10.35747 | 1.496999 | 81.54 | 0.5374 | 27.625 | 30.287 |
| 37 | −19.85686 | 1.03762 | 1.720467 | 34.70 | 0.5834 | 28.256 | −47.764 |
| 38 | −47.53798 | 0.20000 | 1.000000 | 0.00 | 0.0000 | 30.269 | 0.000 |
| 39 | 57.39627 | 4.98220 | 1.438750 | 94.93 | 0.5343 | 31.721 | 112.479 |
| 40 | −348.94714 | 49.43659 | 1.000000 | 0.00 | 0.0000 | 31.777 | 0.000 |
| Image plane | ∞ | | | | | | |

Various data
Zoom ratio 2.60

| | Wide angle | Intermediate | Telephoto |
|---|---|---|---|
| Focal length | 25.00 | 40.00 | 65.00 |
| F-number | 2.60 | 2.60 | 2.60 |
| Half view angle (°) | 31.88 | 21.24 | 13.45 |
| Image height | 15.55 | 15.55 | 15.55 |
| Lens total length | 239.92 | 239.92 | 239.92 |
| BF | 49.44 | 49.44 | 49.44 |
| d17 | 2 | 18.21 | 28.4 |
| d24 | 23.15 | 14.96 | 1.5 |
| d29 | 9 | 0.97 | 4.25 |
| Entrance pupil position | 48.49 | 63.91 | 79.56 |
| Exit pupil position | −78.87 | −78.87 | −78.87 |
| Front principal point position | 68.62 | 91.44 | 111.63 |
| Rear principal point position | 24.44 | 9.44 | −15.56 |

Zoom lens unit data

| Unit | Leading surface | Focal length | Lens configuration length | Front principal point position | Rear principal point position |
|---|---|---|---|---|---|
| 1 | 1 | 46.50 | 82.15 | 52.36 | 26.10 |
| 2 | 18 | −24.00 | 14.73 | 3.80 | −7.34 |
| 3 | 25 | 67.50 | 9.95 | 3.01 | −3.44 |
| 4 | 30 | 69.21 | 49.50 | 32.84 | −16.37 |

NUMERICAL EXAMPLE 2

| | | Unit: mm | | | | |
|---|---|---|---|---|---|---|
| | | Surface data | | | | |
| Surface number | r | d | nd | vd | θgF | Effective aperture | Focal length |
| 1 | 569.09377 | 2.50000 | 1.772499 | 49.60 | 0.5521 | 60.901 | −70.246 |
| 2 | 49.66287 | 13.37511 | 1.000000 | 0.00 | 0.0000 | 54.777 | 0.000 |
| 3 | −79.9188 | 2.30000 | 1.589130 | 61.14 | 0.5406 | 54.739 | −112.798 |
| 4 | 408.02306 | 3.09406 | 1.000000 | 0.00 | 0.0000 | 56.294 | 0.000 |

-continued

| | | | Unit: mm | | | | |
|---|---|---|---|---|---|---|---|
| 5 | 112.28112 | 7.70636 | 1.720467 | 34.70 | 0.5834 | 58.902 | 119.452 |
| 6 | −368.6051 | 2.00000 | 1.000000 | 0.00 | 0.0000 | 59.446 | 0.000 |
| 7 | 206.34761 | 8.86325 | 1.496999 | 81.54 | 0.5374 | 60.794 | 149.796 |
| 8 | −115.33272 | 15.73443 | 1.000000 | 0.00 | 0.0000 | 60.953 | 0.000 |
| 9 | 147.60148 | 2.40000 | 1.846660 | 23.78 | 0.6205 | 56.869 | −102.392 |
| 10 | 54.54195 | 10.13325 | 1.487490 | 70.23 | 0.5300 | 54.911 | 101.597 |
| 11 | −525.18292 | 0.19000 | 1.000000 | 0.00 | 0.0000 | 54.771 | 0.000 |
| 12 | 105.3216 | 6.29682 | 1.589130 | 61.14 | 0.5406 | 54.082 | 165.676 |
| 13 | −1375.48863 | 0.19000 | 1.000000 | 0.00 | 0.0000 | 53.347 | 0.000 |
| 14 | 86.03858 | 6.39104 | 1.729157 | 54.68 | 0.5444 | 51.176 | 117.556 |
| 15 | 138926.0383 | (variable) | 1.000000 | 0.00 | 0.0000 | 49.796 | 0.000 |
| 16 | 34.99716 | 1.42500 | 1.882997 | 40.76 | 0.5667 | 27.336 | −72.631 |
| 17 | 22.25354 | 5.50719 | 1.000000 | 0.00 | 0.0000 | 25.453 | 0.000 |
| 18 | −67.59354 | 1.33000 | 1.589130 | 61.14 | 0.5406 | 25.399 | −63.016 |
| 19 | 83.68381 | 1.14000 | 1.000000 | 0.00 | 0.0000 | 25.514 | 0.000 |
| 20 | 32.48916 | 3.50000 | 1.959060 | 17.47 | 0.6599 | 26.210 | 60.670 |
| 21 | 68.51665 | 3.11055 | 1.000000 | 0.00 | 0.0000 | 25.605 | 0.000 |
| 22 | −51.90144 | 1.23500 | 1.772499 | 49.60 | 0.5521 | 25.530 | −42.723 |
| 23 | 92.79882 | (variable) | 1.000000 | 0.00 | 0.0000 | 25.855 | 0.000 |
| 24 | 283.11036 | 1.33000 | 1.834000 | 37.16 | 0.5775 | 26.788 | −69.257 |
| 25 | 48.12367 | 5.48001 | 1.496999 | 81.54 | 0.5374 | 27.275 | 58.380 |
| 26 | −70.82342 | 0.12825 | 1.000000 | 0.00 | 0.0000 | 28.003 | 0.000 |
| 27 | 69.02571 | 3.76292 | 1.589130 | 61.14 | 0.5406 | 28.973 | 110.369 |
| 28 | −1177.06735 | (variable) | 1.000000 | 0.00 | 0.0000 | 29.045 | 0.000 |
| 29(stop) | ∞ | 1.00000 | 1.000000 | 0.00 | 0.0000 | 29.114 | 0.000 |
| 30 | 31.40773 | 5.67589 | 1.622296 | 53.20 | 0.5542 | 29.291 | 57.226 |
| 31 | 239.58077 | 10.00000 | 1.000000 | 0.00 | 0.0000 | 28.374 | 0.000 |
| 32 | −118.60112 | 4.38050 | 1.808095 | 22.76 | 0.6307 | 23.562 | 46.770 |
| 33 | −29.3646 | 1.03762 | 1.720467 | 34.70 | 0.5834 | 23.059 | −20.270 |
| 34 | 29.88605 | 10.00000 | 1.000000 | 0.00 | 0.0000 | 21.693 | 0.000 |
| 35 | 84.94267 | 9.52402 | 1.496999 | 81.54 | 0.5374 | 28.303 | 35.324 |
| 36 | −21.38315 | 1.03762 | 1.755199 | 27.51 | 0.6103 | 29.200 | −68.341 |
| 37 | −37.05262 | 0.20000 | 1.000000 | 0.00 | 0.0000 | 31.055 | 0.000 |
| 38 | 63.03441 | 4.47896 | 1.589130 | 61.14 | 0.5406 | 32.663 | 115.819 |
| 39 | 769.33635 | 55.44627 | 1.000000 | 0.00 | 0.0000 | 32.591 | 0.000 |
| Image plane | ∞ | | | | | | |

Various data
Zoom ratio 2.67

| | Wide angle | Intermediate | Telephoto |
|---|---|---|---|
| Focal length | 30.00 | 50.00 | 80.00 |
| F-number | 2.60 | 2.60 | 2.60 |
| Half view angle (°) | 27.40 | 17.28 | 11.00 |
| Image height | 15.55 | 15.55 | 15.55 |
| Lens total length | 248.72 | 248.72 | 248.72 |
| BF | 55.45 | 55.45 | 55.45 |
| d15 | 1.59 | 18.97 | 29.02 |
| d23 | 26.23 | 17.01 | 2.73 |
| d28 | 9.00 | 0.84 | 5.06 |
| Entrance pupil position | 54.66 | 75.54 | 94.32 |
| Exit pupil position | −76.32 | −76.32 | −76.32 |
| Front principal point position | 77.83 | 106.57 | 125.75 |
| Rear principal point position | 25.45 | 5.45 | −24.55 |

Zoom lens unit data

| Unit | Leading surface | Focal length | Lens configuration length | Front principal point position | Rear principal point position |
|---|---|---|---|---|---|
| 1 | 1 | 54.00 | 81.17 | 53.22 | 25.18 |
| 2 | 16 | −25.00 | 17.25 | 8.59 | −4.20 |
| 3 | 24 | 82.00 | 10.70 | 5.57 | −1.25 |
| 4 | 29 | 71.11 | 47.33 | 30.98 | −21.43 |

NUMERICAL EXAMPLE 3

| | | Unit: mm | | | | | |
|---|---|---|---|---|---|---|---|
| | | Surface data | | | | | |
| Surface number | r | d | nd | vd | θgF | Effective aperture | Focal length |
| 1 | −387.64273 | 2.50000 | 1.696797 | 55.53 | 0.5433 | 59.898 | −59.064 |
| 2 | 46.38826 | 8.64808 | 1.755199 | 27.51 | 0.6103 | 55.136 | 90.636 |
| 3 | 130.00855 | 5.00033 | 1.000000 | 0.00 | 0.0000 | 54.147 | 0.000 |
| 4 | −198.93482 | 2.50000 | 1.589130 | 61.14 | 0.5406 | 54.025 | −227.124 |
| 5 | 415.54663 | 2.50037 | 1.000000 | 0.00 | 0.0000 | 54.708 | 0.000 |
| 6 | 136.25286 | 3.00000 | 1.805181 | 25.42 | 0.6161 | 56.044 | −181.576 |
| 7 | 70.14039 | 10.81699 | 1.589130 | 61.14 | 0.5406 | 55.871 | 89.414 |
| 8 | −202.60045 | 13.52988 | 1.000000 | 0.00 | 0.0000 | 56.141 | 0.000 |
| 9 | 258.20501 | 2.85000 | 1.720467 | 34.70 | 0.5834 | 55.717 | −121.610 |
| 10 | 65.44554 | 0.05688 | 1.000000 | 0.00 | 0.0000 | 54.938 | 0.000 |
| 11 | 64.07890 | 11.55971 | 1.438750 | 94.93 | 0.5343 | 55.060 | 100.928 |
| 12 | −136.54293 | 0.19000 | 1.000000 | 0.00 | 0.0000 | 55.179 | 0.000 |
| 13 | 73.47706 | 8.63795 | 1.438750 | 94.93 | 0.5343 | 54.241 | 141.235 |
| 14 | −387.57107 | 0.19000 | 1.000000 | 0.00 | 0.0000 | 53.439 | 0.000 |
| 15 | 65.89591 | 7.11833 | 1.487490 | 70.23 | 0.5300 | 51.447 | 152.586 |
| 16 | 542.70635 | (variable) | 1.000000 | 0.00 | 0.0000 | 50.295 | 0.000 |
| 17 | 90.34638 | 1.42500 | 1.772499 | 49.60 | 0.5521 | 28.500 | −43.805 |
| 18 | 24.53389 | 5.49570 | 1.000000 | 0.00 | 0.0000 | 26.391 | 0.000 |
| 19 | −65.70815 | 1.33000 | 1.589130 | 61.14 | 0.5406 | 26.405 | −66.841 |
| 20 | 99.97739 | 1.14000 | 1.000000 | 0.00 | 0.0000 | 27.051 | 0.000 |
| 21 | 38.05226 | 4.85065 | 1.846660 | 23.78 | 0.6205 | 28.433 | 43.812 |
| 22 | −2268.67983 | 2.38400 | 1.000000 | 0.00 | 0.0000 | 28.151 | 0.000 |
| 23 | −47.60904 | 1.23500 | 1.729157 | 54.68 | 0.5444 | 28.068 | −45.632 |
| 24 | 113.33972 | (variable) | 1.000000 | 0.00 | 0.0000 | 28.537 | 0.000 |
| 25 | 326.79061 | 1.20000 | 1.834000 | 37.16 | 0.5775 | 28.981 | −91.748 |
| 26 | 62.21608 | 6.00133 | 1.496999 | 81.54 | 0.5374 | 29.422 | 58.799 |
| 27 | −53.63319 | 0.20000 | 1.000000 | 0.00 | 0.0000 | 30.096 | 0.000 |
| 28 | 67.51788 | 3.77676 | 1.651597 | 58.55 | 0.5426 | 30.910 | 144.366 |
| 29 | 231.53313 | (variable) | 1.000000 | 0.00 | 0.0000 | 30.738 | 0.000 |
| 30(stop) | ∞ | 4.42650 | 1.000000 | 0.00 | 0.0000 | 30.488 | 0.000 |
| 31 | 31.66067 | 9.01039 | 1.620411 | 60.29 | 0.5426 | 30.269 | 48.264 |
| 32 | −530.41808 | 7.64675 | 1.000000 | 0.00 | 0.0000 | 28.182 | 0.000 |
| 33 | −64.40672 | 6.07509 | 1.805181 | 25.42 | 0.6161 | 23.096 | 46.617 |
| 34 | −24.86149 | 1.50000 | 1.737999 | 32.26 | 0.5899 | 22.128 | −17.751 |
| 35 | 28.84693 | 6.87481 | 1.000000 | 0.00 | 0.0000 | 22.056 | 0.000 |
| 36 | −254.47813 | 5.67446 | 1.496999 | 81.54 | 0.5374 | 25.005 | 50.317 |
| 37 | −23.00000 | 1.64526 | 1.000000 | 0.00 | 0.0000 | 25.938 | 0.000 |
| 38 | −22.50692 | 1.50000 | 1.772499 | 49.60 | 0.5521 | 26.032 | −78.195 |
| 39 | −36.81350 | 6.14540 | 1.000000 | 0.00 | 0.0000 | 27.836 | 0.000 |
| 40 | 94.65141 | 5.34629 | 1.595220 | 67.74 | 0.5442 | 32.702 | 69.715 |
| 41 | −72.78282 | 54.89683 | 1.000000 | 0.00 | 0.0000 | 33.010 | 0.000 |
| Image plane | ∞ | | | | | | |

| Various data | | | |
|---|---|---|---|
| Zoom ratio 3.00 | | | |
| | Wide angle | Intermediate | Telephoto |
| Focal length | 40.00 | 70.00 | 120.00 |
| F-number | 2.80 | 2.80 | 2.80 |
| Half view angle (°) | 21.24 | 12.52 | 7.38 |
| Image height | 15.55 | 15.55 | 15.55 |
| Lens total length | 259.93 | 259.93 | 259.93 |
| BF | 54.90 | 54.90 | 54.90 |
| d16 | 1.97 | 21.72 | 32.35 |
| d24 | 29.08 | 18.60 | 1.51 |
| d29 | 10.00 | 0.73 | 7.20 |
| Entrance pupil position | 73.17 | 113.26 | 152.33 |
| Exit pupil position | −92.49 | −92.49 | −92.49 |
| Front principal point position | 102.31 | 150.01 | 174.63 |
| Rear principal point position | 14.90 | −15.10 | −65.10 |

-continued

Unit: mm

Zoom lens unit data

| Unit | Leading surface | Focal length | Lens configuration length | Front principal point position | Rear principal point position |
|---|---|---|---|---|---|
| 1 | 1 | 68.00 | 79.10 | 54.36 | 10.07 |
| 2 | 17 | −25.00 | 17.86 | 5.60 | −6.93 |
| 3 | 25 | 74.00 | 11.18 | 4.98 | −2.11 |
| 4 | 30 | 88.57 | 55.84 | 37.87 | −26.32 |

NUMERICAL EXAMPLE 4

Unit: mm

Surface data

| Surface number | r | d | nd | vd | θgF | Effective aperture | Focal length |
|---|---|---|---|---|---|---|---|
| 1 | −204.79851 | 2.50000 | 1.696797 | 55.53 | 0.5433 | 62.091 | −115.366 |
| 2 | 133.93464 | 0.20000 | 1.000000 | 0.00 | 0.0000 | 61.905 | 0.000 |
| 3 | 91.69315 | 3.72815 | 2.102050 | 16.77 | 0.6721 | 62.534 | 355.261 |
| 4 | 116.67681 | 4.63519 | 1.000000 | 0.00 | 0.0000 | 61.950 | 0.000 |
| 5 | −3328.10384 | 2.50000 | 1.696797 | 55.53 | 0.5433 | 61.981 | −354.526 |
| 6 | 268.15995 | 2.00000 | 1.000000 | 0.00 | 0.0000 | 62.278 | 0.000 |
| 7 | 244.03004 | 8.40980 | 1.620411 | 60.29 | 0.5426 | 62.904 | 137.836 |
| 8 | −130.70000 | 3.00000 | 1.654115 | 39.70 | 0.5737 | 63.082 | −580.448 |
| 9 | −200.50000 | 17.84704 | 1.000000 | 0.00 | 0.0000 | 63.428 | 0.000 |
| 10 | 157.56595 | 2.85000 | 1.846660 | 23.78 | 0.6205 | 61.590 | −132.757 |
| 11 | 65.42970 | 0.59717 | 1.000000 | 0.00 | 0.0000 | 59.994 | 0.000 |
| 12 | 66.79239 | 11.66371 | 1.496999 | 81.54 | 0.5374 | 60.241 | 105.153 |
| 13 | −229.34107 | 0.19000 | 1.000000 | 0.00 | 0.0000 | 60.162 | 0.000 |
| 14 | 69.82956 | 9.08594 | 1.487490 | 70.23 | 0.5300 | 58.600 | 151.196 |
| 15 | 1197.68869 | 0.19000 | 1.000000 | 0.00 | 0.0000 | 57.449 | 0.000 |
| 16 | 84.53680 | 6.59855 | 1.620411 | 60.29 | 0.5426 | 55.734 | 178.009 |
| 17 | 345.20662 | (variable) | 1.000000 | 0.00 | 0.0000 | 54.273 | 0.000 |
| 18 | 115.60141 | 1.42500 | 1.772499 | 49.60 | 0.5521 | 30.692 | −43.106 |
| 19 | 25.80886 | 6.09645 | 1.000000 | 0.00 | 0.0000 | 28.296 | 0.000 |
| 20 | −64.68927 | 1.33000 | 1.589130 | 61.14 | 0.5406 | 28.312 | −65.105 |
| 21 | 95.85406 | 1.14000 | 1.000000 | 0.00 | 0.0000 | 29.108 | 0.000 |
| 22 | 41.92068 | 6.12593 | 1.846660 | 23.78 | 0.6205 | 30.632 | 45.368 |
| 23 | −484.67721 | 2.52170 | 1.000000 | 0.00 | 0.0000 | 30.324 | 0.000 |
| 24 | −47.97539 | 1.23500 | 1.729157 | 54.68 | 0.5444 | 30.247 | −49.743 |
| 25 | 152.99974 | (variable) | 1.000000 | 0.00 | 0.0000 | 30.877 | 0.000 |
| 26 | 116.05829 | 5.58544 | 1.589130 | 61.14 | 0.5406 | 32.320 | 64.177 |
| 27 | −55.39353 | 0.12825 | 1.000000 | 0.00 | 0.0000 | 32.523 | 0.000 |
| 28 | 91.69957 | 8.25612 | 1.496999 | 81.54 | 0.5374 | 31.995 | 58.440 |
| 29 | −41.41239 | 1.33000 | 1.800999 | 34.97 | 0.5863 | 31.213 | −61.762 |
| 30 | −249.24669 | (variable) | 1.000000 | 0.00 | 0.0000 | 31.105 | 0.000 |
| 31(stop) | ∞ | 2.91177 | 1.000000 | 0.00 | 0.0000 | 29.303 | 0.000 |
| 32 | 33.09875 | 7.50204 | 1.620411 | 60.29 | 0.5426 | 28.376 | 67.061 |
| 33 | 145.56585 | 9.56548 | 1.000000 | 0.00 | 0.0000 | 26.187 | 0.000 |
| 34 | −121.47875 | 3.89638 | 1.805181 | 25.42 | 0.6161 | 20.882 | 37.522 |
| 35 | −24.72443 | 1.50000 | 1.737999 | 32.26 | 0.5899 | 20.911 | −17.475 |
| 36 | 28.08335 | 8.73653 | 1.000000 | 0.00 | 0.0000 | 20.782 | 0.000 |
| 37 | −118.63157 | 6.43084 | 1.496999 | 81.54 | 0.5374 | 24.545 | 53.011 |
| 38 | −22.00000 | 0.74840 | 1.000000 | 0.00 | 0.0000 | 25.901 | 0.000 |
| 39 | −21.49045 | 1.50000 | 1.816000 | 46.62 | 0.5568 | 25.918 | −91.821 |
| 40 | −31.01771 | 8.02212 | 1.000000 | 0.00 | 0.0000 | 27.619 | 0.000 |
| 41 | 55.68313 | 4.88195 | 1.589130 | 61.14 | 0.5406 | 33.032 | 83.152 |
| 42 | 407.26788 | 45.96507 | 1.000000 | 0.00 | 0.0000 | 33.040 | 0.000 |
| Image plane | ∞ | | | | | | |

Various data
Zoom ratio 3.11

| | Wide angle | Intermediate | Telephoto |
|---|---|---|---|
| Focal length | 45.00 | 80.00 | 140.00 |
| F-number | 2.80 | 2.80 | 2.80 |
| Half view angle (°) | 19.06 | 11.00 | 6.34 |
| Image height | 15.55 | 15.55 | 15.55 |

-continued

| Unit: mm | | | |
|---|---|---|---|
| Lens total length | 257.46 | 257.46 | 257.46 |
| BF | 45.97 | 45.97 | 45.97 |
| d17 | 1.50 | 23.19 | 32.54 |
| d25 | 31.63 | 20.74 | 2.38 |
| d30 | 11.50 | 0.69 | 9.70 |
| Entrance pupil position | 80.79 | 138.4 | 197.15 |
| Exit pupil position | −96.93 | −96.93 | −96.93 |
| Front principal point position | 111.62 | 173.62 | 199.98 |
| Rear principal point position | 0.97 | −34.04 | −94.03 |

| Zoom lens unit data | | | | | |
|---|---|---|---|---|---|
| Unit | Leading surface | Focal length | Lens configuration length | Front principal point position | Rear principal point position |
| 1 | 1 | 73.00 | 76.00 | 51.28 | 4.66 |
| 2 | 18 | −25.00 | 19.87 | 5.66 | −8.06 |
| 3 | 26 | 58.00 | 15.30 | 1.31 | −8.45 |
| 4 | 31 | 106.46 | 55.70 | 46.06 | −15.74 |

NUMERICAL EXAMPLE 5

| Unit: mm | | | | | | |
|---|---|---|---|---|---|---|
| Surface data | | | | | | |
| Surface number | r | d | nd | vd | θgF | Effective aperture | Focal length |
| 1 | 295.01268 | 2.66000 | 1.772499 | 49.60 | 0.5521 | 72.176 | −91.878 |
| 2 | 57.20621 | 16.51744 | 1.000000 | 0.00 | 0.0000 | 65.371 | 0.000 |
| 3 | −126.03429 | 2.37500 | 1.589130 | 61.14 | 0.5406 | 65.361 | −256.308 |
| 4 | −752.89141 | 1.04955 | 1.000000 | 0.00 | 0.0000 | 66.519 | 0.000 |
| 5 | 92.29299 | 4.75000 | 1.922860 | 18.90 | 0.6495 | 69.140 | 234.329 |
| 6 | 155.58877 | 3.80686 | 1.000000 | 0.00 | 0.0000 | 68.901 | 0.000 |
| 7 | 344.35398 | 2.28000 | 1.805181 | 25.42 | 0.6161 | 69.233 | −245.887 |
| 8 | 126.07007 | 14.08461 | 1.589130 | 61.14 | 0.5406 | 69.331 | 104.438 |
| 9 | −116.07149 | 18.59321 | 1.000000 | 0.00 | 0.0000 | 69.722 | 0.000 |
| 10 | 99.01089 | 2.18500 | 1.805181 | 25.42 | 0.6161 | 63.476 | −159.575 |
| 11 | 55.58844 | 16.67748 | 1.496999 | 81.54 | 0.5374 | 61.426 | 88.788 |
| 12 | −195.44112 | 0.19000 | 1.000000 | 0.00 | 0.0000 | 60.748 | 0.000 |
| 13 | 66.75712 | 8.88535 | 1.595220 | 67.74 | 0.5442 | 57.417 | 122.045 |
| 14 | 752.89620 | (variable) | 1.000000 | 0.00 | 0.0000 | 55.734 | 0.000 |
| 15 | 98.72346 | 1.23500 | 1.816000 | 46.62 | 0.5568 | 25.757 | −53.696 |
| 16 | 30.28261 | 4.84874 | 1.000000 | 0.00 | 0.0000 | 23.508 | 0.000 |
| 17 | −55.04852 | 1.14000 | 1.589130 | 61.14 | 0.5406 | 22.470 | −31.974 |
| 18 | 29.02742 | 4.45572 | 1.808095 | 22.76 | 0.6307 | 21.197 | 37.017 |
| 19 | 683.54291 | 1.82601 | 1.000000 | 0.00 | 0.0000 | 20.577 | 0.000 |
| 20 | −43.07889 | 1.23500 | 1.772499 | 49.60 | 0.5521 | 20.518 | −53.747 |
| 21* | 1337.73630 | (variable) | 1.000000 | 0.00 | 0.0000 | 20.895 | 0.000 |
| 22 | 66.18922 | 1.23500 | 1.834000 | 37.16 | 0.5775 | 21.741 | −88.269 |
| 23 | 34.65998 | 3.06641 | 1.487490 | 70.23 | 0.5300 | 21.745 | 58.382 |
| 24 | −157.47489 | 0.19000 | 1.000000 | 0.00 | 0.0000 | 21.895 | 0.000 |
| 25 | 90.68628 | 1.90796 | 1.589130 | 61.14 | 0.5406 | 22.109 | 112.137 |
| 26 | −244.91474 | (variable) | 1.000000 | 0.00 | 0.0000 | 22.124 | 0.000 |
| 27(stop) | ∞ | 1.49938 | 1.000000 | 0.00 | 0.0000 | 21.531 | 0.000 |
| 28 | 31.00767 | 1.42500 | 1.755199 | 27.51 | 0.6103 | 21.431 | −75.913 |
| 29 | 19.78262 | 3.46411 | 1.592010 | 67.02 | 0.5357 | 20.634 | 42.707 |
| 30 | 83.92386 | 14.71759 | 1.000000 | 0.00 | 0.0000 | 20.349 | 0.000 |
| 31 | 48.39285 | 3.81455 | 1.761821 | 26.52 | 0.6135 | 18.560 | 20.996 |
| 32 | −23.38220 | 1.20000 | 1.749505 | 35.33 | 0.5818 | 18.490 | −15.573 |
| 33 | 24.14287 | 15.00026 | 1.000000 | 0.00 | 0.0000 | 18.114 | 0.000 |
| 34 | 37.69649 | 7.47218 | 1.496999 | 81.54 | 0.5374 | 26.161 | 35.644 |
| 35 | −31.38922 | 4.19375 | 1.000000 | 0.00 | 0.0000 | 26.323 | 0.000 |
| 36 | −28.03877 | 1.20000 | 1.903660 | 31.32 | 0.5946 | 24.753 | −61.931 |
| 37 | −56.90913 | 46.04769 | 1.000000 | 0.00 | 0.0000 | 25.488 | 0.000 |
| Image plane | ∞ | | | | | | |

| Unit: mm |
|---|
| Aspherical surface data |

21st surface

K = 6.47521e+003 A4 = 7.28288e−007 A6 = 1.43818e−009 A8 = −1.89454e−011 A10 = −7.91776e−014 A12 = 9.52326e−016

| Various data Zoom ratio 5.00 | | | |
|---|---|---|---|
| | Wide angle | Intermediate | Telephoto |
| Focal length | 30.00 | 70.00 | 150.00 |
| F-number | 4.00 | 4.00 | 4.00 |
| Half view angle (°) | 27.40 | 12.52 | 5.92 |
| Image height | 15.55 | 15.55 | 15.55 |
| Lens total length | 274.98 | 274.98 | 274.98 |
| BF | 46.05 | 46.05 | 46.05 |
| d14 | 1.50 | 32.58 | 44.16 |
| d21 | 38.25 | 25.71 | 1.50 |
| d26 | 20.00 | 1.47 | 14.09 |
| Entrance pupil position | 66.66 | 129.34 | 198.76 |
| Exit pupil position | −57.05 | −57.05 | −57.05 |
| Front principal point position | 87.93 | 151.81 | 130.52 |
| Rear principal point position | 16.05 | −23.95 | −103.95 |

| Zoom lens unit data | | | | | |
|---|---|---|---|---|---|
| Unit | Leading surface | Focal length | Lens configuration length | Front principal point position | Rear principal point position |
| 1 | 1 | 63.20 | 94.05 | 61.05 | 18.81 |
| 2 | 15 | −22.00 | 14.74 | 5.31 | −5.12 |
| 3 | 22 | 69.00 | 6.40 | 2.13 | −2.05 |
| 4 | 27 | 95.06 | 53.99 | 16.56 | −37.00 |

NUMERICAL EXAMPLE 6

| Unit: mm | | | | | | |
|---|---|---|---|---|---|---|
| Surface data | | | | | | |
| Surface number | r | d | nd | vd | θgF | Effective aperture | Focal length |
| 1 | 4223.62978 | 2.50000 | 1.696797 | 55.53 | 0.5433 | 61.571 | −86.684 |
| 2 | 59.78700 | 10.22649 | 1.000000 | 0.00 | 0.0000 | 56.665 | 0.000 |
| 3 | −146.88609 | 2.20000 | 1.696797 | 55.53 | 0.5433 | 56.615 | −244.586 |
| 4 | −1042.17543 | 6.91855 | 1.000000 | 0.00 | 0.0000 | 56.954 | 0.000 |
| 5 | 93.47373 | 5.17118 | 1.808095 | 22.76 | 0.6307 | 62.443 | 280.417 |
| 6 | 154.04313 | 2.50000 | 1.000000 | 0.00 | 0.0000 | 62.354 | 0.000 |
| 7 | 222.07620 | 8.59235 | 1.487490 | 70.23 | 0.5300 | 62.803 | 169.972 |
| 8 | −131.20537 | 16.57309 | 1.000000 | 0.00 | 0.0000 | 63.049 | 0.000 |
| 9 | 111.48673 | 2.85000 | 1.805181 | 25.42 | 0.6161 | 60.674 | −136.130 |
| 10 | 54.89059 | 13.36539 | 1.496999 | 81.54 | 0.5374 | 58.518 | 85.836 |
| 11 | −178.29679 | 0.19000 | 1.000000 | 0.00 | 0.0000 | 58.228 | 0.000 |
| 12 | 72.85828 | 8.19012 | 1.595220 | 67.74 | 0.5442 | 55.439 | 128.730 |
| 13 | 1330.23098 | (variable) | 1.000000 | 0.00 | 0.0000 | 53.890 | 0.000 |
| 14 | 39.06758 | 1.42500 | 1.772499 | 49.60 | 0.5521 | 28.548 | −77.609 |
| 15 | 23.32081 | 5.36255 | 1.000000 | 0.00 | 0.0000 | 26.000 | 0.000 |
| 16 | −77.14879 | 1.33000 | 1.589130 | 61.14 | 0.5406 | 25.973 | −67.116 |
| 17 | 82.28676 | 1.14000 | 1.000000 | 0.00 | 0.0000 | 26.222 | 0.000 |
| 18 | 33.53582 | 4.01958 | 1.846660 | 23.78 | 0.6205 | 27.145 | 56.613 |
| 19 | 103.13541 | 2.89438 | 1.000000 | 0.00 | 0.0000 | 26.656 | 0.000 |
| 20 | −52.21673 | 1.23500 | 1.589130 | 61.14 | 0.5406 | 26.586 | −50.763 |
| 21 | 71.25518 | (variable) | 1.000000 | 0.00 | 0.0000 | 26.820 | 0.000 |
| 22 | 146.90596 | 3.99420 | 1.589130 | 61.14 | 0.5406 | 27.183 | 80.980 |
| 23 | −70.34347 | 0.12825 | 1.000000 | 0.00 | 0.0000 | 27.448 | 0.000 |
| 24 | −562.62295 | 4.30225 | 1.496999 | 81.54 | 0.5374 | 27.415 | 84.489 |
| 25 | −39.28096 | 1.33000 | 1.834000 | 37.16 | 0.5775 | 27.413 | −83.883 |

-continued

Unit: mm

| | | | | | | | | |
|---|---|---|---|---|---|---|---|---|
| 26 | −90.22950 | (variable) | 1.000000 | 0.00 | 0.0000 | 27.784 | 0.000 |
| 27(stop) | ∞ | | 1.00000 | 1.000000 | 0.00 | 0.0000 | 27.617 | 0.000 |
| 28 | 34.58038 | 4.67355 | 1.618000 | 63.33 | 0.5441 | 27.579 | 59.758 |
| 29 | 488.38014 | 13.55541 | 1.000000 | 0.00 | 0.0000 | 26.918 | 0.000 |
| 30 | −77.11980 | 2.59571 | 2.102050 | 16.77 | 0.6721 | 20.604 | 107.591 |
| 31 | −47.81605 | 1.50000 | 1.728250 | 28.46 | 0.6077 | 20.917 | −28.866 |
| 32 | 38.57836 | 13.79597 | 1.000000 | 0.00 | 0.0000 | 21.253 | 0.000 |
| 33 | 120.06049 | 5.73515 | 1.592400 | 68.30 | 0.5456 | 29.338 | 52.370 |
| 34 | −41.28142 | 5.68368 | 1.000000 | 0.00 | 0.0000 | 29.894 | 0.000 |
| 35 | −28.86122 | 1.50000 | 1.903660 | 31.32 | 0.5946 | 29.814 | −106.338 |
| 36 | −42.13698 | 0.20000 | 1.000000 | 0.00 | 0.0000 | 31.248 | 0.000 |
| 37 | 60.30831 | 6.34934 | 1.589130 | 61.14 | 0.5406 | 33.009 | 98.013 |
| 38 | −1435.31250 | 43.99960 | 1.000000 | 0.00 | 0.0000 | 32.940 | 0.000 |
| Image plane | ∞ | | | | | | |

Various data
Zoom ratio 2.86

| | Wide angle | Intermediate | Telephoto |
|---|---|---|---|
| Focal length | 35.00 | 60.00 | 100.00 |
| F-number | 2.80 | 2.80 | 2.80 |
| Half view angle (°) | 23.95 | 14.53 | 8.84 |
| Image height | 15.55 | 15.55 | 15.55 |
| Lens total length | 256.34 | 256.34 | 256.34 |
| BF | 44.00 | 44.00 | 44.00 |
| d13 | 1.90 | 27.21 | 41.12 |
| d21 | 31.71 | 20.00 | 1.50 |
| d26 | 15.70 | 2.10 | 6.69 |
| Entrance pupil position | 64.70 | 97.79 | 127.01 |
| Exit pupil position | −93.92 | −93.92 | −93.92 |
| Front principal point position | 90.82 | 131.68 | 154.51 |
| Rear principal point position | 9.00 | −16.00 | −56.00 |

Zoom lens unit data

| Unit | Leading surface | Focal length | Lens configuration length | Front principal point position | Rear principal point position |
|---|---|---|---|---|---|
| 1 | 1 | 75.40 | 79.28 | 59.32 | 26.22 |
| 2 | 14 | −31.20 | 17.41 | 8.32 | −4.68 |
| 3 | 22 | 83.00 | 9.75 | 2.41 | −3.90 |
| 4 | 27 | 77.99 | 56.59 | 34.72 | −31.32 |

TABLE 1

Corresponding values of conditional expressions in Numerical Examples 1 to 6

| | Numerical Example 1 | Numerical Example 2 | Numerical Example 3 | Numerical Example 4 | Numerical Example 5 | Numerical Example 6 |
|---|---|---|---|---|---|---|
| Wide-angle end focal length | 25.00 | 30.00 | 40.00 | 45.00 | 30.00 | 35.00 |
| Telephoto end focal length | 65.00 | 80.00 | 120.00 | 140.00 | 150.00 | 100.00 |
| Zoom magnification | 2.60 | 2.67 | 3.00 | 3.11 | 5.00 | 2.86 |
| f1 | 46.50 | 54.00 | 68.00 | 73.00 | 63.20 | 75.40 |
| f2 | −24.00 | −25.00 | −25.00 | −25.00 | −22.00 | −31.20 |
| f3 | 67.50 | 82.00 | 74.00 | 58.00 | 69.00 | 83.00 |
| f4 | 69.21 | 71.11 | 88.57 | 106.46 | 95.06 | 77.99 |
| f41 | 74.78 | 57.23 | 48.26 | 67.06 | 104.45 | 59.81 |
| f42 | −46.37 | −35.14 | −27.18 | −32.48 | −74.81 | −38.87 |
| f43 | 46.75 | 44.99 | 49.05 | 52.56 | 68.53 | 51.39 |
| β3w | −19.52 | 12.07 | −12.90 | −2.67 | −9.08 | −26.18 |
| Ld4 | 42.70 | 46.33 | 51.42 | 52.78 | 52.49 | 55.59 |
| Ld41 | 6.78 | 10.00 | 7.65 | 9.57 | 14.72 | 13.58 |
| Ld42 | 10.00 | 10.00 | 6.87 | 8.74 | 15.00 | 13.90 |
| θ42p | 0.6205 | 0.6307 | 0.6161 | 0.6161 | 0.6135 | 0.6721 |
| θ42n | 0.5834 | 0.5834 | 0.5899 | 0.5899 | 0.5818 | 0.6077 |
| ν42p | 23.78 | 22.76 | 25.42 | 25.42 | 26.52 | 16.77 |

TABLE 1-continued

Corresponding values of conditional expressions in Numerical Examples 1 to 6

|  |  | Numerical Example 1 | Numerical Example 2 | Numerical Example 3 | Numerical Example 4 | Numerical Example 5 | Numerical Example 6 |
|---|---|---|---|---|---|---|---|
|  | ν42n | 34.70 | 34.70 | 32.26 | 32.26 | 35.33 | 28.46 |
|  | θ43p | 0.5358 | 0.5390 | 0.5408 | 0.5390 | 0.5374 | 0.5404 |
|  | θ43n | 0.5834 | 0.6103 | 0.5521 | 0.5568 | 0.5946 | 0.5946 |
|  | ν43p | 88.24 | 71.34 | 74.64 | 71.34 | 81.54 | 63.29 |
|  | ν43n | 34.70 | 27.51 | 49.60 | 46.62 | 31.32 | 31.32 |
|  | n42p | 1.85 | 1.81 | 1.81 | 1.81 | 1.76 | 2.10 |
|  | n42n | 1.72 | 1.72 | 1.74 | 1.74 | 1.75 | 1.73 |
| Conditional expression (1) | $1/\beta 3w$ | −0.05 | 0.08 | −0.08 | −0.37 | −0.11 | −0.04 |
| Conditional expression (2) | \|f42/f4\| | 0.67 | 0.49 | 0.31 | 0.31 | 0.79 | 0.50 |
| Conditional expression (3) | Ld41/Ld4 | 0.16 | 0.22 | 0.15 | 0.18 | 0.28 | 0.24 |
| Conditional expression (4) | Ld42/Ld4 | 0.23 | 0.22 | 0.13 | 0.17 | 0.29 | 0.25 |
| Conditional expression (5) | (θ42p − θ42n)/(ν42p − ν42n) | −3.39E−03 | −3.96E−03 | −3.83E−03 | −3.83E−03 | −3.60E−03 | −5.52E−03 |
| Conditional expression (6) | \|f1/f2\| | 1.94 | 2.16 | 2.72 | 2.92 | 2.87 | 2.42 |
| Conditional expression (7) | \|f2/f3\| | 0.36 | 0.30 | 0.34 | 0.43 | 0.32 | 0.38 |
| Conditional expression (8) | \|f41/f42\| | 1.61 | 1.63 | 1.78 | 2.06 | 1.40 | 1.54 |
| Conditional expression (9) | \|f43/f42\| | 1.01 | 1.28 | 1.80 | 1.62 | 0.92 | 1.32 |
| Conditional expression (10) | (θ43p − θ43n)/(ν43p − ν43n) | −8.89E−04 | −1.63E−03 | −4.49E−04 | −7.18E−04 | −1.14E−03 | −1.70E−03 |
| Conditional expression (11) | n42p − n42n | 0.13 | 0.09 | 0.07 | 0.07 | 0.01 | 0.37 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-091815, filed Apr. 13, 2012, which is hereby incorporated by reference herein in its entirety.

What is claimed is:

1. A zoom lens comprising, in order from an object side to an image side:
a first lens unit which does not move for zooming and has a positive refractive power;
a second lens unit which moves during zooming and has a negative refractive power;
a third lens unit which moves during zooming and has a positive refractive power; and
a fourth lens unit which does not move for zooming and has a positive refractive power,
wherein lenses forming the fourth lens unit are spaced at a first air interval and a second air interval in the fourth lens unit, and the fourth lens unit includes, in order from the object side to the image side, a 41 lens group having a positive refractive power, a 42 lens group having a negative refractive power, and a 43 lens group having a positive refractive power,
wherein the 42 lens group includes one or more positive lenses and one or more negative lenses, and
wherein the following conditions are satisfied:

$-0.50 < 1/\beta 3w < 0.50;$ $0.20 < |f42/f4| < 0.90;$ $0.10 < Ld41/Ld4 < 0.40;$ $0.10 < Ld42/Ld4 < 0.40;$ and $-6.00 \times 10^{-3} < (\theta 42p - \theta 42n)/(\nu 42p - \nu 42n) < -2.50 \times 10^{-3},$ where β3w corresponds to a lateral magnification of the third lens unit at a wide-angle end when an infinite object is focused, f4 corresponds to a focal length of the fourth lens unit, Ld4 corresponds to a length on an optical axis from a most object side lens surface to a most image side lens surface of the fourth lens unit, Ld41 corresponds to an air interval between the 41 lens group and the 42 lens group, Ld42 corresponds to an air interval between the 42 lens group and the 43 lens group, f42 corresponds to a focal length of the 42 lens group, ν42p corresponds to an average value of Abbe constants of materials of the positive lenses included in the 42 lens group, θ42p corresponds to an average value of partial dispersion ratios of the materials of the positive lenses included in the 42 lens group, and ν42n corresponds to an average value of Abbe constants of materials of the negative lenses included in the 42 lens group, and θ42n corresponds to an average value of partial dispersion ratios of the materials of the negative lenses included in the 42 lens group.

2. The zoom lens according to claim 1, wherein the following conditions are satisfied:

$1.50 < |f1/f2| < 3.20;$ and $0.20 < |f2/f3| < 0.50,$ where f1 corresponds to a focal length of the first lens unit, f2 corresponds to a focal length of the second lens unit, and f3 corresponds to a focal length of the third lens unit.

3. The zoom lens according to claim 1, wherein the following conditions are satisfied:

$$1.00<|f41/f42|<2.50; \text{ and}$$

$$0.90<|f43/f42|<2.00,$$

where f41 corresponds to a focal length of the 41 lens group and f43 corresponds to a focal length of the 43 lens group.

4. The zoom lens according to claim 1, wherein:
the 43 lens group includes one or more positive lenses and one or more negative lenses, and
the following condition is satisfied:

$$-2.50 \times 10^{-3} < (\theta 43p - \theta 43n)/(v43p - v43n) < -1.00 \times 10^{-3},$$

where v43p corresponds to an average value of Abbe constants of materials of the positive lenses included in the 43 lens group, θ43p corresponds to an average value of partial dispersion ratios of the materials of the positive lenses included in the 43 lens group, and v43n corresponds to an average value of Abbe constants of materials of the negative lenses included in the 43 lens group, and θ43n corresponds to an average value of partial dispersion ratios of the materials of the negative lenses included in the 43 lens group.

5. The zoom lens according to claim 1, wherein the following condition is satisfied:

$$0.00 < n42p - n42n < 0.40,$$

where n42p corresponds to an average value of refractive indices of materials of the positive lenses included in the 42 lens group, and n42n corresponds to an average value of refractive indices of materials of the negative lenses included in the 42 lens group.

6. The zoom lens according to claim 1, wherein the 42 lens group comprises a cemented lens obtained by cementing a positive lens having a convex surface on the object side and a negative lens having a concave surface on the image side.

7. The zoom lens according to claim 1, wherein the 42 lens group comprises a cemented lens obtained by cementing a positive lens having a concave surface on the object side and a negative lens having a concave surface on the image side.

8. The zoom lens according to claim 1, wherein the 43 lens group includes a positive lens, a negative lens, and a positive lens in order from the object side to the image side.

9. The zoom lens according to claim 1, wherein the 43 lens group includes a positive lens and a negative lens in order from the object side to the image side.

10. An image pickup apparatus comprising:
a zoom lens comprising, in order from an object side to an image side:
a first lens unit which does not move for zooming and has a positive refractive power;
a second lens unit which moves during zooming and has a negative refractive power;
a third lens unit which moves during zooming and has a positive refractive power; and
a fourth lens unit which does not move for zooming and has a positive refractive power,
wherein lenses forming the fourth lens unit are spaced at a first air interval and a second air interval in the fourth lens unit, and the fourth lens unit includes, in order from the object side to the image side, a 41 lens group having a positive refractive power, a 42 lens group having a negative refractive power, and a 43 lens group having a positive refractive power,
wherein the 42 lens group includes one or more positive lens and one or more negative lens, and
wherein the following conditions are satisfied:

$$-0.50 < 1/\beta 3w < 0.50;$$

$$0.20 < |f42/f4| < 0.90;$$

$$0.10 < Ld41/Ld4 < 0.40;$$

$$0.10 < Ld42/Ld4 < 0.40; \text{ and}$$

$$-6.00 \times 10^{-3} < (\theta 42p - \theta 42n)/(v42p - v42n) < -2.50 \times 10^{-3},$$

where β3w corresponds to a lateral magnification of the third lens unit at a wide-angle end when an infinite object is focused, f4 corresponds to a focal length of the fourth lens unit, Ld4 corresponds to a length on an optical axis from a most object side lens surface to a most image side lens surface of the fourth lens unit, Ld41 corresponds to an air interval between the 41 lens group and the 42 lens group, Ld42 corresponds to an air interval between the 42 lens group and the 43 lens group, f42 corresponds to a focal length of the 42 lens group, v42p corresponds to an average value of Abbe constants of materials of the positive lenses included in the 42 lens group, θ42p corresponds to an average value of partial dispersion ratios of the materials of the positive lenses included in the 42 lens group, and v42n corresponds to an average value of Abbe constants of materials of the negative lenses included in the 42 lens group, θ42n corresponds to an average value of partial dispersion ratios of the materials of the negative lenses included in the 42 lens group; and
a solid-state image sensor configured to receive an image formed by the zoom lens.

* * * * *